United States Patent [19]

Ehlert

[11] Patent Number: 5,110,403
[45] Date of Patent: May 5, 1992

[54] HIGH EFFICIENCY ULTRASONIC ROTARY HORN

[75] Inventor: Thomas D. Ehlert, Neenah, Wis.
[73] Assignee: Kimberly-Clark Corporation, Neenah, Wis.
[21] Appl. No.: 526,073
[22] Filed: May 18, 1990
[51] Int. Cl.[5] ............................................. B29C 65/08
[52] U.S. Cl. ................................ 156/580.1; 156/73.1; 228/1.1
[58] Field of Search ................. 156/580.1, 580.2, 73.1; 228/1.1

[56] References Cited

U.S. PATENT DOCUMENTS

| Re. 33,063 | 9/1989 | Obeda | 156/73.1 |
|---|---|---|---|
| 3,017,792 | 1/1962 | Elmore | 78/82 |
| 3,096,672 | 7/1963 | Jones | 80/60 |
| 3,217,957 | 11/1965 | Jarvie | 228/1 |
| 3,224,915 | 12/1965 | Balamuth | 156/73.1 |
| 3,272,682 | 9/1966 | Balamuth | 156/580.1 |
| 3,292,838 | 12/1966 | Farley | 228/1.1 |
| 3,455,015 | 7/1969 | Daniels | 29/470.1 |
| 3,550,419 | 12/1970 | Fox | 72/199 |
| 3,562,041 | 2/1971 | Robertson | 156/73.1 |
| 3,575,752 | 4/1971 | Carpenter | 156/73.2 |
| 3,620,061 | 11/1971 | Cuningham | 72/199 |
| 3,623,926 | 11/1971 | Sager | 156/73.1 |
| 3,677,861 | 7/1972 | Knauf | 156/73.2 |
| 3,678,720 | 7/1972 | Dickey | 72/160 |
| 3,733,238 | 5/1973 | Long | 156/580.2 |
| 3,844,869 | 10/1974 | Rust, Jr. | 156/358 |
| 3,908,808 | 9/1975 | Busker | 100/35 |
| 3,939,033 | 2/1976 | Grgach | 156/515 |
| 3,955,740 | 5/1976 | Shoh | 228/1.1 |
| 3,993,532 | 11/1976 | McDonald | 156/580.2 |
| 4,252,586 | 2/1981 | Scott | 156/73.1 |
| 4,333,791 | 6/1982 | Onishi | 156/580.1 |
| 4,404,052 | 9/1983 | Persson | 156/73.1 |
| 4,473,432 | 9/1984 | Leader | 156/582 |
| 4,659,614 | 4/1987 | Vitale | 428/218 |
| 4,668,316 | 5/1987 | Sager | 156/73.1 |

FOREIGN PATENT DOCUMENTS

| 260888 | 5/1963 | Australia . |
| 0313425 | 4/1989 | European Pat. Off. . |
| 2259203 | 6/1974 | Fed. Rep. of Germany . |
| 3147255 | 6/1983 | Fed. Rep. of Germany . |
| 1459687 | 10/1966 | France . |
| 42-22222 | 10/1967 | Japan . |
| 51-69578 | 6/1976 | Japan . |
| 58-42049 | 3/1983 | Japan . |
| 178656 | 3/1966 | U.S.S.R. . |
| 272020 | 8/1970 | U.S.S.R. . |
| 277524 | 11/1970 | U.S.S.R. . |
| 524699 | 10/1976 | U.S.S.R. . |
| 670406 | 6/1979 | U.S.S.R. . |
| 785-051 | 12/1980 | U.S.S.R. . |
| 1018971 | 2/1966 | United Kingdom . |

OTHER PUBLICATIONS

"Experimental Study of the Vibrations of Solid, Isotropic, Elastic Cylinders", G. W. McMahon, J. Acoust. Soc. Am., 36, 85 (1964).

Primary Examiner—Michael Wityshyn
Attorney, Agent, or Firm—William E. Maycock

[57] ABSTRACT

An ultrasonic rotary horn intended to be excited at a frequency of from about 18 to about 60 kHz, which horn is a shaped, solid metal object having a rotational axis and a radial surface terminated by a first end and a second end. The horn is radially symmetrical. The thickness of the horn at the rotational axis is greater than the width of the horn at the radial surface. The diameter, width, and thickness of the horn are selected for a desired frequency so that the horn, upon being excited by ultrasonic energy at such frequency which is input at the rotational axis at, and substantially perpendicular to, one or both ends, is adapted to resonate in a manner such that:

(1) the excited end moves substantially in phase with the movement of the source of excitation;
(2) the opposing end, whether or not it is actively excited, moves substantially out of phase with the movement of the excited end;
(3) the radial work-contacting surface also moves substantially out of phase with the movement of the excited end; and
(4) the horn exhibits a single nodal point at its geometric center;

In addition, the first end and the second end have a substantially convex configuration which comprises a central, circular, flat portion which is concentric with the rotational axis and a generally concave portion from the flat portion to said radial surface.

12 Claims, 21 Drawing Sheets

HIGH EFFICIENCY ULTRASONIC ROTARY HORN

CROSS-REFERENCES TO RELATED APPLICATIONS

The ultrasonic rotary horn of which the present application is an improved variation is described and claimed in copending and commonly assigned application Ser. No. 525,523, entitled ULTRASONIC ROTARY HORN and filed of even date herewith in the names of Joseph G. Neuwirth, Thomas D. Ehlert, and Norman R. Stegelmann.

An improved end configuration for the horn of application Ser. No. 525,523 is described and claimed in copending and commonly assigned application Ser. No. 525,507, entitled ULTRASONIC ROTARY HORN HAVING IMPROVED END CONFIGURATION and filed of even date in the name of Joseph G. Neuwirth.

BACKGROUND OF THE INVENTION

The present invention relates to an ultrasonic rotary horn. More particularly, the present invention relates to a high efficiency ultrasonic rotary horn.

The ultrasonic rotary horn described in above-referenced application Ser. No. 525,523 is intended to be excited at a frequency of from about 18 to about 60 kHz. The horn comprises a shaped, solid metal object having a radial surface terminated by a first end and a second end, and a rotational axis, in which each of the ends is defined by a surface and the object is radially symmetrical. The horn has the following characteristics:

(A) the diameter of the horn is in the range of from about 4 cm to about 19 cm;

(B) the width of the horn at the radial surface is from about 0.6 cm to about 13 cm;

(C) the thickness of the horn at the rotational axis thereof is from about 0.6 cm to about 15 cm and is independent of the width of the horn at the radial surface;

(D) the horn has a mass in the range of from about 0.06 kg to about 30 kg; and (E) the diameter, width, and thickness are selected for a desired frequency so that the horn, upon being excited by ultrasonic energy at such frequency which is input at the rotational axis at, and substantially perpendicular to, one or both ends, is adapted to resonate in a manner such that:

(1) the excited end moves substantially in phase with the movement of the source of excitation;

(2) the opposing end, whether or not it is actively excited, moves substantially out of phase with the movement of the excited end;

(3) the radial work-contacting surface also moves substantially out of phase with the movement of the excited end; and (4) the horn exhibits a single nodal point at its geometric center.

Such horns typically exhibited horn gains (as defined hereinafter) of roughly 1-2.5, efficiencies (as defined hereinafter) of roughly 0.1-0.3 microns per watt, and power-related gains (as defined hereinafter) of roughly 6-14 watt$^{-1} \times 10^3$. These horns represent a significant improvement over ultrasonic rotary horns previously available. A unique horn has been discovered, however, which results in a significantly higher efficiency, even though such unique horn responds to longitudinal ultrasonic excitation in same way as do the horns of application Ser. No. 525,523.

The use of ultrasonic energy to bond and/or cut thermoplastic materials on a continuous basis is well established, with one of the earliest references being British Patent No. 1,018,971 to Bull which issued in 1966. Applications include the continuous seaming or point bonding of roll goods (Canadian Patent No. 1,092,053 to USS Engineers and Consultants, Inc.), the ultrasonic bonding of materials to form a pattern in a multilayer web which subsequently is cut out of the web (U.S. Pat. No. 3,562,041 to Robertson), the sealing of the ends of individual absorbent products (U.S. Pat. No. 3,677,861 to Knauf), the patterned lamination of webs of nonwoven fabric, fiberfill, and woven shell fabric to produce mattress pads and bedspreads (U.S. Pat. No. 3,733,238 to Long et al.), and the simultaneous bonding and cutting of two webs to form gloves (U.S. Pat. No. 3,939,033 to Grgach et al.).

Many applications of ultrasonic energy for the bonding and/or cutting of thermoplastic materials involve ultrasonic horns or tools which are stationary (i.e., non-rotating), in which the direction of application of the horn working surface is coincident with the direction of the applied mechanical vibrations. Such horns most commonly are stepped cylinders or stepped blades. Thus, the working surface of the horn is moved axially against a rigid anvil of suitable design, with the materials to be bonded or cut being positioned between the horn and the anvil.

In an interesting variation of the rigid horn configuration, one reference is known which discloses a horn which does not come in contact with the materials to be bonded. See U.S. Pat. No. 4,668,316 to Sager.

Another configuration, which is more conducive to continuous high-speed bonding operations, is that of a stationary horn and a rotating anvil; see, by way of illustration, U.S. Pat. Nos. 3,562,041, 3,733,238, and 3,939,033, infra, U.S. Pat. No. 3,844,869 to Rust Jr. (apparatus for ultrasonic welding of sheet materials), U.S. Pat. No. 3,993,532 to McDonald et al. (ultrasonic sealing pattern roll, i.e., patterned rotating anvil), and U.S. Pat. No. 4,659,614 to Vitale (ultrasonically bonded nonwoven fabric through the use of a patterned rotating anvil), and German Published Patent Application No. 2,259,203 to J. H. Benecke GmbH (improvement of physical properties of nonwoven materials by ultrasonic bonding). In this configuration, the materials to be bonded are passed continuously between the horn and the rotating anvil. The linear velocity of the materials typically is equal to the tangential velocity of the working surface of the rotating anvil. See, also, U.S. Pat. No. 3,575,752 to Carpenter in which a rigid anvil is employed immediately before a drive drum.

Although the use of a rotating anvil was a significant improvement in continuous bonding processes involving the application of ultrasonic energy, such use has some inherent limitations which adversely affect line speed and bonding quality. It is, of course, necessary to continuously pass the materials to be bonded between the narrow gap formed by the rotating anvil and the rigid, stationary horn. This often leads to a damming effect at the leading edge of the horn, as well as to possible compression variations due to nonuniformities in material thickness. Hence, there is created a stick-slip condition which strongly influences the efficiency of acoustic energy transfer. This greatly affects the resulting bond quality which in turn limits line speeds. This phenomenon also limits the compressible bulk or thickness of the materials to be bonded.

One approach to diminish the extent of these limitations has been the development of the arcuate profiled horn which gives a progressive convergent-divergent gap. See, for example, U.S. Pat. No. 4,404,052 to Persson et al. Another approach has been to orient a modified stepped-blade horn parallel with and between the sheets to be bonded as shown in U.S. Pat. No. Re. 33,063 to Obeda. It is apparent, however, that as long as a stationary horn is used, the problems associated with movement of the materials to be bonded past the horn cannot be eliminated entirely in view of the fact that intimate contact is necessary for efficient acoustic energy transfer.

The approach which appears to have received the most attention is the use of a rotating (rotary) horn in conjunction with a rotating anvil. Such a configuration is best described as two or more cylindrical surfaces which are in close proximity to each other and rotating in opposite directions with equal tangential velocities. The materials to be bonded pass between the cylindrical surfaces at a linear velocity which is equal to the tangential velocities of such surfaces. Thus, the opportunity for damming and stick-slip is virtually eliminated.

The concept of an ultrasonic rotary horn, typically used in conjunction with a rotating anvil for the bonding of a variety of materials, is, of course, well known. See, by way of illustration, U.S. Pat. No. 3,017,792 to Elmore et al. (vibratory device), U.S. Pat. No. 3,217,957 to Jarvie et al. (welding apparatus), U.S. Pat. No. 3,224,915 to Balamuth et al. (method of joining thermoplastic sheet material by ultrasonic vibrations), U.S. Pat. No. 3,272,682 to Balamuth et al. (apparatus for joining thermoplastic sheet material), U.S. Pat. No. 3,455,015 to Daniels et al. (ultrasonic welding method and apparatus), U.S. Pat. No. 3,623,926 to Sager (method and apparatus for the assembly of thermoplastic members), U.S. Pat. No. 3,955,740 to Shoh (vibratory seam welding apparatus), U.S. Pat. No. 4,252,586 to Scott (method and apparatus for the manufacture of slide fastener stringer with folded and bonded continuous molded coupling elements), U.S. Pat. No. 4,333,791 to Onishi (ultrasonic seam welding apparatus), and U.S. Pat. No. 4,473,432 Leader et al. (dot heat stapling); Russian Patent Nos. 178,656 (ultrasonic seam welder), 272,020 (ultrasonic seam welding unit), 277,524 (ultrasonic metal welder), 524,699 (ultrasonic seam welder for plastics), 670,406 (apparatus for ultrasonic seam welding), and 785,051 (equipment for seam welding polymeric materials); Japanese Published Patent Application Nos. 51-69578 (oscillator system for continuous ultrasonic welding of plastic) and 58-42049 (continuous ultrasonic jointing device for photographic papers); French Patent No. 1,459,687 (ultrasonic welding of an aluminum foil onto a glass sheet see also Japanese Patent No. 42-22222); German Published Patent Application No. 3,147,255 to Licentia Patent-Verwaltungs-GmbH (apparatus for welding solar cell contacts and connectors); and Australian Patent No. 260,888 to Knudsen et al. (ultrasonic welding rollers for use in making a metal container).

Nonbonding applications involving rotary horns also are known, some examples of which are included here for completeness: U.S. Pat. No. 3,096,672 to Jones (vibrating roll and method), U.S. Pat. No. 3,292,838 to Farley (rotating sonic welder), U.S. Pat. No. 3,550,419 to Fox et al. (methods and apparatus for metal rolling), U.S. Pat. No. 3,620,061 to Cunningham et al. (design of ultrasonic transducers for use with rolling mill rolls), U.S. Pat. No. 3,678,720 to Dickey et al. (roller leveler and method of leveling), and U.S. Pat. No. 3,908,808 to Busker (ultrasonic calendaring of paper webs).

One commercially available bonding system employing an ultrasonic rotary horn is known. This system, manufactured by Mecasonic, a French firm (available from Mecasonic-KLN, Inc., Fullerton, Calif.), exploits the so-called Poisson coupling effect. Maximum radial displacement is achieved at a region of minimal longitudinal displacement which is one-quarter wavelength from the free end of a one-wavelength circular shaft that is ultrasonically excited longitudinally, i.e., along its axis. by a piezoelectric crystal assembly. An ultrasonic rotary horn which appears to be essentially the same as the Mecasonic horn is described in Japanese Published Patent Application No. 51-69578, mentioned earlier. See also European Patent Application No. 88402437.3, Publication No. 0 313 425 A1 to Société Mecasonic, which describes the use of the Mecasonic horn in conjunction with a rotating anvil or support to smooth freshly stitched seams in flexible materials.

The larger diameter or disk portion of the horn is situated at a longitudinal node where the radial displacement of the disk portion is maximum, i.e., at the radial antinode. The entire length of the horn is equal to one wavelength and the shorter distance from the center of the disk portion to the free or nondriven end of the horn is one-quarter wavelength. Upon subjecting the horn to ultrasonic excitation at the driven end, when the source of excitation moves toward the driven end of the horn, the entire horn moves longitudinally away from the source of excitation while the radial surface moves inwardly. When the source of excitation moves away from the driven end, the entire horn moves toward it while the radial surface moves outwardly. While the radial motion is at a maximum at the center of the disk portion, it diminishes rapidly in either direction across the surface of the disk portion with increasing distance from the longitudinal node (radial antinode). In cases where bond strength is at least in part a function of amplitude, this variation in amplitude must result in a variation in bond strength. Hence, the useful width of the disk portion may be reduced to something less than the actual width of 30 mm if a uniform bond strength is desired across the width of the bond zone. Such nonuniformity clearly is undesirable unless the minimum bond strength achieved will withstand the stresses placed upon the bond zone.

It may be noted at this point that the horns described by U.S. Pat. Nos. 3,017,792, 3,217,957, 3,455,015, and 3,955,740, infra, function differently from both the Mecasonic horn and the horn of the present invention. Those horns exhibit flexural motion only, with the exception of the horn of U.S. Pat. No. 3,955,740; the horn of that patent also can exhibit radial motion, but with significantly different characteristics than the horn of the present invention.

SUMMARY OF THE INVENTION

It therefore is an object of the present invention to provide an ultrasonic rotary horn having improved efficiency.

Another object of the present invention is to provide a high efficiency ultrasonic rotary horn which can be operated at an excitation frequency of from about 18 to about 60 kHz.

Another object of the present invention is to provide a high efficiency ultrasonic rotary horn which, upon being excited by ultrasonic energy which is input at, and substantially perpendicular to, one or both ends along the rotational axis of said horn, is adapted to resonate in a manner such that the movement of the excited end and the movement of the opposing end, whether or not it is actively excited, are out of phase; the radial surface of the horn moves out of phase with the movement of the excited end; and the horn exhibits a single nodal point at its geometric center.

Still another object of the present invention is to provide an ultrasonic horn which operates at an efficiency (as hereinafter) of greater than 0.2 microns per watt.

A further object of the present invention is to provide an ultrasonic rotary horn which is capable of operating at an efficiency (as defined hereinafter) of greater than 0.3 microns per watt.

A still further object of the present invention is to provide an ultrasonic rotary horn which is capable of achieving radial amplitudes of 40-110 microns at an input power of no more than about 400 watts.

These and other objects will be apparent to one having ordinary skill in the art from a consideration of the specification and claims which follow.

Accordingly, the present invention provides, in an ultrasonic rotary horn intended to be excited at a frequency of from about 18 to about 60 kHz, which horn comprises a shaped, solid metal object having a radial surface terminated by a first end and a second end, and a rotational axis, in which each of said ends is defined by a surface and said object is radially symmetrical, the improvement which comprises:

(A) the diameter of said horn is in the range of from about 4 cm to about 19 cm;

(B) the width of said horn at said radial surface is from about 0.6 cm to about 13 cm;

(C) the thickness of said horn at the rotational axis thereof is from about 0.6 cm to about 15 cm and is independent of the width of said horn at said radial surface;

(D) the thickness of said horn at the rotational axis is greater than the width of said horn at said radial surface;

(E) said horn has a mass in the range of from about 0.06 kg to about 30 kg;

(F) said diameter, width, and thickness are selected for a desired frequency so that said horn, upon being excited by ultrasonic energy at such frequency which is input at the rotational axis at, and substantially perpendicular to, one or both ends, is adapted to resonate in a manner such that:

(1) the excited end moves substantially in phase with the movement of the source of excitation;

(2) the opposing end, whether or not it is actively excited, moves substantially out of phase with the movement of the excited end;

(3) said radial work-contacting surface also moves substantially out of phase with the movement of the excited end; and (4) said horn exhibits a single nodal point at its geometric center;

(G) said horn operates at an efficiency of greater than 0.2 microns per watt; and (H) said first end and said second end have a substantially convex configuration which comprises a central, circular, flat portion which is concentric with said rotational axis and a generally concave portion from said flat portion to said radial surface, in which:

(1) the diameter of said flat portion is at least about 20 percent of the diameter of the horn;

(2) said generally concave portion is a curved surface having radial symmetry and a curvilinear profile in cross-section through said rotational axis which lies in the triangular area defined by (i) a straight line leading from the outer boundary of said flat portion to the edge of said radial surface; (ii) a straight line which is parallel with the rotational axis and which begins at the outer boundary of said flat portion and extends inwardly toward the interior of said horn; and (iii) a straight line which is perpendicular to the rotational axis and which extends from the edge of said radial surface to said straight line parallel with the rotational axis.

The present invention further provides, in an apparatus for ultrasonically bonding two or more materials together, or otherwise ultrasonically processing a material, which apparatus comprises an ultrasonic rotary horn intended to be excited at a frequency of from about 18 to about 60 kHz, a vibrator means for providing a source of longitudinal mechanical vibration coupled to one or both ends of said horn, optionally through an elongated waveguide, support means for said ultrasonic rotary horn, drive means for rotating said ultrasonic rotary horn, and a rotatable anvil in close proximity to said ultrasonic rotary horn, the improvement which comprises employing as said ultrasonic rotary horn a shaped, solid metal object having a radial surface terminated by a first end and a second end, and a rotational axis, in which each of said ends is defined by a surface and said object is radially symmetrical, in which:

(A) the diameter of said horn is in the range of from about 4 cm to about 19 cm;

(B) the width of said horn at said radial surface is from about 0.6 cm to about 13 cm;

(C) the thickness of said horn at the rotational axis thereof is from about 0.6 cm to about 15 cm and is independent of the width of said horn at said radial surface;

(D) the thickness of said horn at the rotational axis is greater than the width of said horn at said radial surface;

(E) said horn has a mass in the range of from about 0.06 kg to about 30 kg;

(F) said diameter, width, and thickness are selected for a desired frequency so that said horn, upon being excited by ultrasonic energy at such frequency which is input at the rotational axis at, and substantially perpendicular to, one or both ends, is adapted to resonate in a manner such that:

(1) the excited end moves substantially in phase with the movement of the source of excitation;

(2) the opposing end, whether or not it is actively excited, moves substantially out of phase with the movement of the excited end;

(3) said radial work-contacting surface also moves substantially out of phase with the movement of the excited end; and (4) said horn exhibits a single nodal point at its geometric center;

(G) said horn operates at an efficiency of greater than 0.2 microns per watt; and (H) said first end and said second end have a substantially convex configuration which comprises a central, circular, flat portion which is concentric with said rotational axis and a generally concave portion from said flat portion to said radial surface, in which:

(1) the diameter of said flat portion is at least about 20 percent of the diameter of the horn;

(2) said generally concave portion is a curved surface having radial symmetry and a curvilinear profile in cross-section through said rotational axis which lies in the triangular area defined by (i) a straight line leading from the outer boundary of said flat portion to the edge of said radial surface; (ii) a straight line which is parallel with the rotational axis and which begins at the outer boundary of said flat portion and extends inwardly toward the interior of said horn; and (iii) a straight line which is perpendicular to the rotational axis and which extends from the edge of said radial surface to said straight line parallel with the rotational axis.

In certain preferred embodiments, said radial surface has a profile as defined hereinafter which is substantially linear. In other preferred embodiments, said radial surface has a profile which is nonlinear.

The high efficiency ultrasonic rotary horn of the present invention is particularly useful in continuous processes for bonding together two or more layers of at least partly thermoplastic materials, such as woven and nonwoven fabrics and films.

DETAILED DESCRIPTION OF THE INVENTION

Figure 1A:
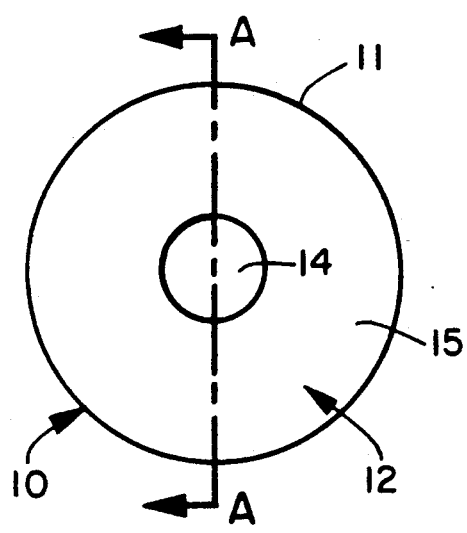
FIGS. 1A and 1B are plain and cross-sectional diagrammatic representations, respectively, of the high efficiency ultrasonic rotary horn of the present invention.

As used herein, the terms "bonding" and "welding" are synonymous and simply refer to the substantially permanent joining of at least one layer of a material with another layer of a like or different material. The nature of the materials to be bonded is not known to be critical. However, the present invention is particularly useful in the bonding of two or more layers of materials selected from the group consisting of woven fabrics, nonwoven fabrics, and films which preferably are made at least in part from thermoplastic polymers. The present invention also is useful in processes involving the ultrasonic perforation of a material.

It should be apparent that adequate bonding can be achieved by a variety of mechanisms. For example, the bond can result from the partial or complete melting in the bonding zone of all of the materials to be bonded. In this case, there is partial or complete fusion in the bonding area of such materials. Alternatively, the bond can result from the partial or complete melting of one of the materials to be bonded, with the partially or completely melted material flowing into or onto adjacent materials which in turn results in a mechanical interlocking of one material with another.

As used herein, the term "fabric" is used broadly herein to mean a sheet or web of a woven or nonwoven material which may be continuous, as in a roll, or discontinuous.

The term "substantially convex" is used in relation to a surface of an end of the high efficiency ultrasonic rotary horn of the present invention to mean that no portion of such a surface extends inwardly toward the interior of the horn beyond the plane defined by the radial surface edge closest to such surface, such plane being perpendicular to the longitudinal axis of the horn.

The term "gravest mode" is used herein to mean the most fundamental resonant mode of vibration for a particular geometry under a given set of conditions.

The term "amplitude" is used herein to mean the distance of maximum displacement of a surface upon excitation, or total peak-to-peak excursion. Such displacement or excursion is reported throughout this specification in microns. The term "efficiency" is used herein to mean amplitude per watt of input or excitation power and thus has the units, microns per watt.

The terms "amplitude ratio" and "horn gain" are used interchangeably herein to mean the ratio of the radial amplitude to the longitudinal amplitude. As applied to the ultrasonic rotary horn of the present invention, the radial amplitude is the amplitude of the radial surface of the horn and the longitudinal amplitude is the amplitude of an end. Unless specified otherwise, the longitudinal amplitude refers to the movement of the driven end. Because horn gain is a ratio of values having the same units, it is unitless.

The term "gain" or "booster gain" is used herein to mean the ratio of output longitudinal amplitude to input longitudinal amplitude of a booster. The term "total gain" refers to the combined gain of two boosters employed in combination. All three of these gain terms are, of course, unitless.

"Variance" is a convenient way of mathematically expressing an amplitude profile. It is a calculated value for the radial surface of the horn. Variance is calculated as the difference between the highest amplitude value and the lowest amplitude value divided by the highest value, times 100. Thus, variance is a percentage.

As used herein, the term "width" generally refers to the width of the radial surface or the thickness of the horn at the radial surface. The term "thickness" is used preferentially to refer to the width or thickness of the horn at the center or rotational axis of the horn. However, the terms occasionally are used more generally, but, if so used, the meanings will be clear from the context. Stated differently, unless another, broader meaning is clear from the context, each term will have the meaning specified above.

Turning now to the high efficiency ultrasonic rotary horn of the present invention, the shaped, solid metal object which comprises the high efficiency ultrasonic rotary horn of the present invention for convenience often is referred to herein as the horn of the present invention or, when permitted by the context, simply as "the horn" or "said horn" or variations thereof.

A driven end is an end at which the cyclic mechanical excitation is applied at the rotational axis, either directly or through a stud, axle, and/or waveguide or booster. The term "other end" means the remaining end, whether or not that end also is a driven end. Either end may be supported, either by a suitable support means or by a waveguide or booster. Moreover, both ends may be driven ends, in which case the relationships of the ends to each other and to other surfaces still hold true, and the claims are meant to be so interpreted.

It should be apparent that the terms "first end" and "second end" are synonymous with the terms "driven end" and "other end". The first pair of terms refer to the horn structurally, while the second pair refers to the horn functionally. Thus, the horn clearly has but two ends, i.e., a "first end" and a "second end", either or both of which may be a "driven end". If only one end is a driven end, then the second end is an "other end". If both ends are driven ends, the "other end" also is a "driven end".

Upon subjecting the horn of the present invention to ultrasonic mechanical excitation, assuming that there is but a single driven end, when the source of excitation moves toward the driven end of the horn, the driven end moves away from the source of excitation. Thus, the driven end moves inwardly toward the interior of the horn (or toward the other end). The other end, however, also moves inwardly toward the interior of the horn (or toward the driven end or the source of excitation). Although both ends are moving inwardly toward the interior of the horn, they are moving in opposite directions. Thus, the movements of the ends relative to each other are said to be out of phase. The movements of the ends would be in phase if they moved in the same direction, i.e., away from the source of excitation, as the source of excitation moves toward the horn.

Consistent with the foregoing definition of "out of phase", the movements of the ends would be in phase if the ends moved in the same direction, e.g., away from the source of excitation as the source of excitation moves toward the horn. In this case, the driven end would move inwardly or toward the interior of the horn as the other end moves outwardly or away from the horn. The movement of the driven end, of course, always will be in phase with the movement of the source of excitation. Consequently, the movement of the other end always will be out of phase with the source of excitation.

When both ends are driven ends, it should be apparent to those having ordinary skill in the art that the movements of the ends with respect to each other must be synchronized with the movements just described in order to avoid imposing additional stresses within the horn.

As the source of excitation moves toward the horn with the concomitant motion of the driven end inwardly toward the interior of the horn, the movement of the radial surface of the horn of the present invention is outward or away from the rotational axis. This movement of the radial surface relative to the movement of the driven end is defined as out of phase. On the other hand, if the radial surface moved inwardly toward the rotational axis, that movement relative to the inward movement of the driven end would be defined as in phase.

It should be apparent to one having ordinary skill in the art that the above definitions of "out of phase" and "in phase" are arbitrary or subjective. What is important, however, is not the definitions selected, but how the definitions apply to different horns. This will be more evident from the examples where the movements of the radial surfaces and the driven ends are described in more detail.

Because of the movements of the ends and the radial surface of the horn of the present invention as just described, there is, when the horn is excited, a single nodal point where no motion of any kind takes place. This point lies on the rotational axis and is located at the geometric center of the horn. It is a significant distinguishing feature of the horn of the present invention.

The configuration of the radial surface of the high efficiency ultrasonic rotary horn of the present invention typically is described herein as having a given profile. As so used, the term "profile" has reference to the line describing the radial surface when viewed in cross-section through the rotational axis of the horn. Thus, when the radial surface is flat, e.g., every point on the radial surface is equidistant from the rotational axis of the horn, the profile of the radial surface is said to be linear. Similarly, if the radial surface has been roughened, such as by grit blasting, plasma spraying, or textured chromium coating, but is otherwise substantially flat, the profile of the radial surface is substantially linear. If the radial surface is not flat, e.g., the surface has one or more raised areas (lands) or depressions (grooves or valleys), the profile is nonlinear. The term "nonlinear" is intended to be broad in scope and not limited to specific embodiments mentioned herein by way of illustration. Thus, if the profile is nonlinear, the radial surface can have distinct features, such as one or more lands or groves, or a smoothly or gradually changing curved surface, or some combination of distinct features and a gradually changing curved surface.

As already indicated, the high efficiency ultrasonic rotary horn of the present invention comprises a shaped, solid metal object. In general, any metal having suitable acoustical and mechanical properties can be used. As a practical matter, however, the most suitable metals are aluminum, monel, titanium, and some alloy steels. If desired, the horn can be coated or plated with another metal to reduce abrasive wear. For applications requiring high amplitude and higher stress, titanium is preferred.

In general, such variables as the diameter, mass, width, and thickness of the horn, and the configuration of the ends of the horn, are not critical, provided that such variables come within the ranges specified herein. Such variables are critical, however, if a horn is desired which will resonate in the gravest mode at a particular frequency and with a given amplitude. Stated differently, any horn coming within the specifications provided herein will vibrate in the gravest mode at a given frequency, but that given frequency may be lower or higher than the frequency desired or considered optimum for a particular application. Vibration in the gravest mode at the desired frequency is achieved by adjusting the diameter of the horn. The amplitude ratio or gain primarily is dependent upon the thickness:width ratio.

In general, resonant frequency is inversely proportional to horn diameter. Such frequency also is inversely proportional to horn mass. However, the frequency is much more sensitive to changes in horn diameter than to changes in either horn mass or horn width. Moreover, horn gain varies inversely with horn width. On the other hand, horn efficiency, defined as radial amplitude in microns per watt of input or excitation power, increases with increasing horn width.

Figure 1B:
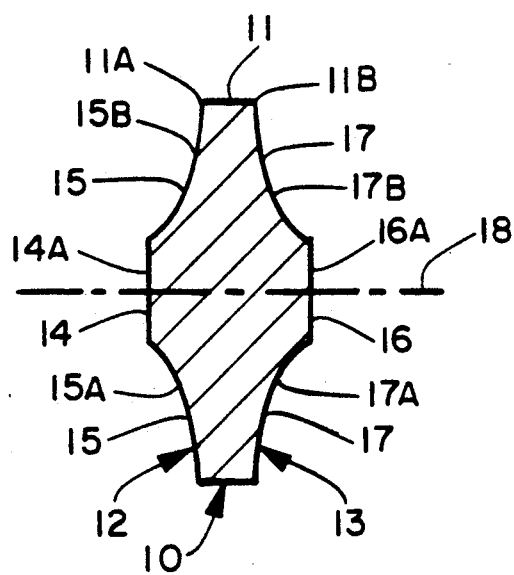

The ultrasonic rotary horn of the present invention is represented diagrammatically by FIGS. 1A and 1B. FIG. 1A shows a plain view of the horn, while FIG. 1B shows a cross-sectional view along line A—A of FIG. 1A; in the two figures, like components or parts are indicated by like numbers. In FIGS. 1A and 1B, horn 10 has a radial surface 11, first end 12, and second end 13. Horn 10 is radially symmetrical, i.e., circular or cylindrical, as shown by end 12 in FIG. 1A. Radial surface 11 is terminated by edges 11A and 11B. End 12 is substantially convex and has flat, circular portion 14 and generally concave portion 15. End 12 is defined in cross-section by curved lines 15A and 15B which are mirror images of each other, such that end 12 is radially symmetrical, and by straight line 14A. Curved lines 15A and 15B represent generally concave portion 15 and straight line 14A represents flat, circular portion 14. Similarly, end 13 is substantially convex and has flat, circular portion 16 and generally concave portion 17. In addition, end 13 is defined in cross-section by curved lines 17A and 17B which are mirror images of each other, such that end 13 is radially symmetrical, and by straight line 16A which represents face 16. End 13 is a mirror image of end 12, and horn 10, ends 12 and 13, and flat, circular portions 14 and 16 are concentric and centered on rotational axis 18 of horn 10. The thickness of horn 10 along rotational axis 18 is greater than the width of horn 10 at radial surface 11.

If desired, a hub can be present on either or each of the ends of the horn. However, the presence of hubs in general reduces the gain of the horn and such effect must be taken into account when designing the horn. As used herein, the term "hub" means a right circular cylindrical section which extends from the flat, circular portion of an end. If present, the dimensions of hubs are not known to be critical. Typically, hubs will have a diameter of the order of from about 20 to about 30 percent of the horn diameter and a shoulder height of up to about 1.8 cm. In addition, any end can include, either with or without a hub, an elongated waveguide which is an integral part of the horn.

The use of the term "integral part" with respect to any feature or component of the high efficiency ultrasonic rotary horn of the present invention means that such feature or component is formed from the same piece of material as the horn so that there are no structural discontinuities between such feature or component and the horn. Thus, any feature or component which subsequently must be attached to the horn by any means is not an integral part of the horn.

Figure 2:
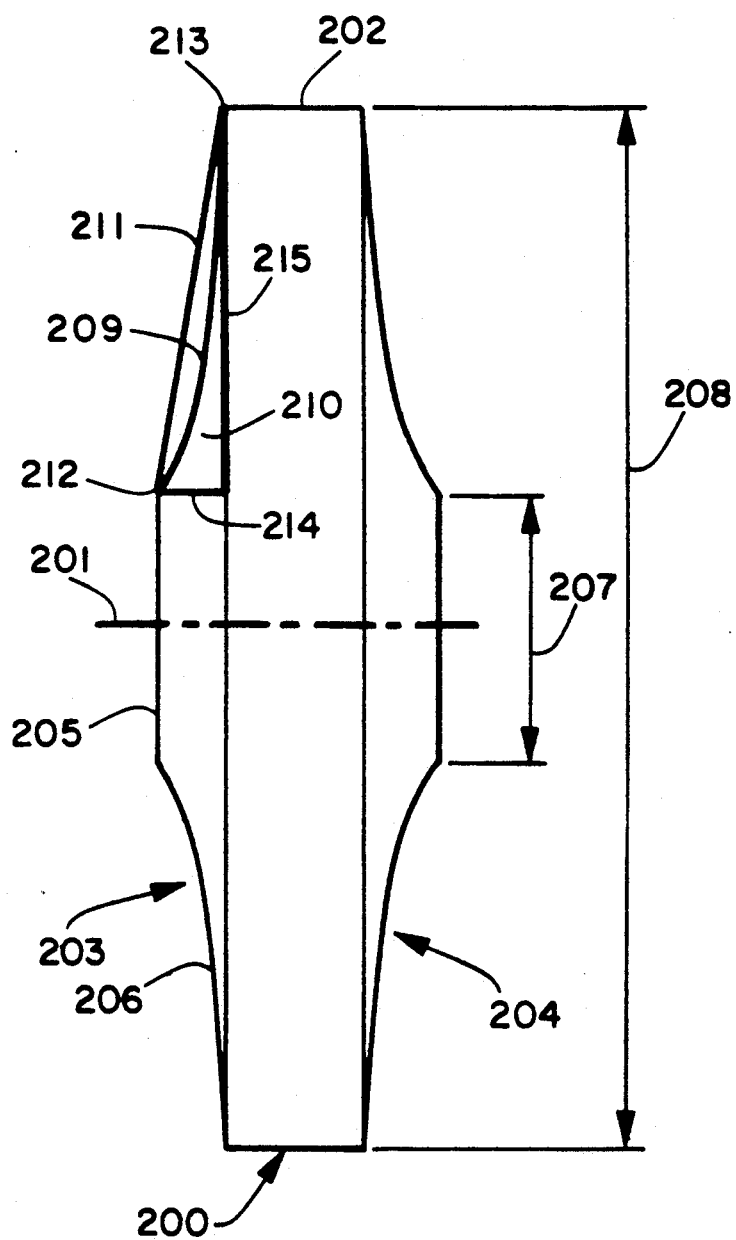
FIG. 2 is a diagrammatic side-view representation in cross-section through the longitudinal axis of the high efficiency ultrasonic rotary horn of the present invention and illustrates the unique characteristics of the horn.

The high efficiency horn of the present invention perhaps is better understood with reference to FIG. 2 which is an end-view diagrammatic representation of the horn of the present invention in cross-section through the rotational axis. In FIG. 2, horn 200 has rotational axis 201, radial surface 202, and substantially convex ends 203 and 204. The ends are radially symmetrical and mirror images of each other. An end consists of central, circular, flat portion 205 and generally concave portion 206. Flat portion 205 is concentric with the rotational axis and has diameter 207 which is at least about 20 percent of diameter 208 of horn 200. Generally concave portion 206 is a curved surface having radial symmetry and curvilinear profile 209 in cross-section through rotational axis 201 which lies in the triangular area 210 defined by (i) straight line 211 leading from outer boundary 212 of flat portion 205 to edge 213 of radial surface 202; (ii) straight line 214 which is parallel with rotational axis 201 and which begins at outer boundary 212 of flat portion 205 and extends inwardly toward the interior of horn 200; and (iii) straight line 215 which is perpendicular to rotational axis 201 and which extends from edge 213 of radial surface 202 to straight line 214. Line 215 lies in the plane of edge 213 of radial surface 202.

In general, the profile of the curved surface of each end is described by various methods known to those having ordinary skill in the art of the geometry of surfaces. For example, the profile can be circular, second order, inverse second order, parabolic, exponential, inverse exponential, catenary, inverse catenary, gaussian, inverse gaussian, combinations thereof, and the like. Formulas useful for the more common profiles, i.e., circular, second order, parabloic, and exponential, are given below, with reference to FIG. 3. In each case, x and y are the Cartesian values of the points defining the concave surface.

Circular profile $$y = \{[(L/2)^2 + (r-d)^2]/2(r-d)]^2 - (x-L/2)^2\}^{\frac{1}{2}} - \{[(L/2)^2 + (r-d)^2]/2(r-d)] - (L/2)^2\}^{\frac{1}{2}} \quad (1)$$

in which L is the length of the profile, r is the radius of the circle defining the concave surface, and d is the depth of the concave surface relative to the edge of the radial surface.

Second order profile $$y = a(x)^2 - b(x) \quad (2)$$

Figure 3:
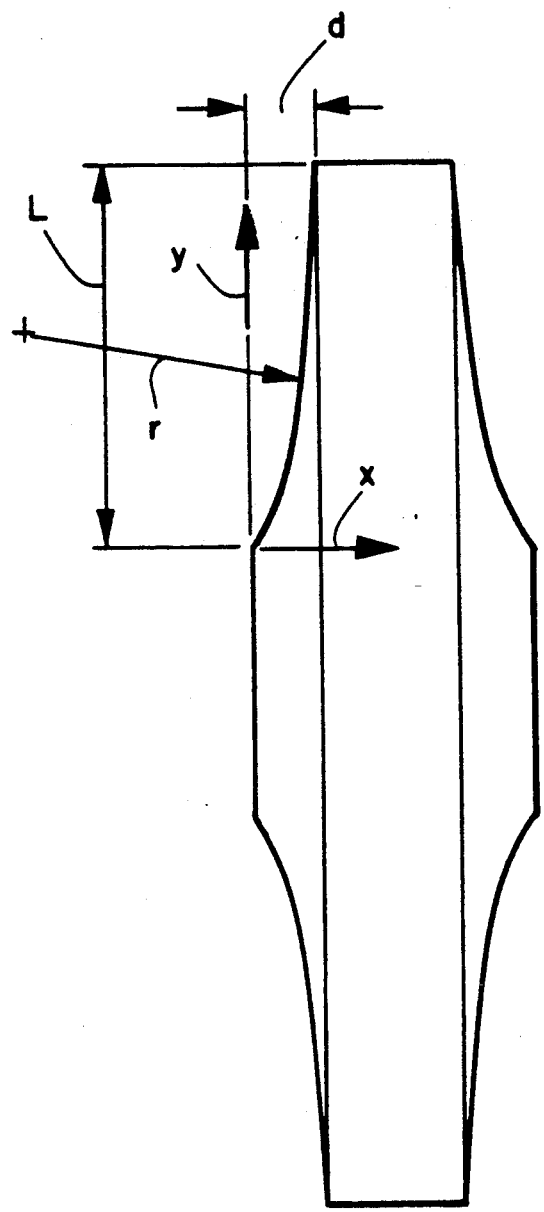
FIG. 3 is a diagrammatic side-view representation of the high efficiency ultrasonic rotary horn of the present invention illustrating the variables of three different equations which can be used to determine the curvature of the generally concave portions of the substantially convex ends.

Parabolic profile $$y = a(x)^2 \quad (3)$$

which is the profile illustrated in FIG. 3. A typical value for a is 10.

Exponential profile $$y = a'e^{b'x} - a' \quad (4)$$

In general L and r, or the coefficients a and b or a' and b', are chosen to yield a desired value for d which typically will be in the range from about 0.1 cm to about 4.5 cm, depending upon the width of the radial surface and the characteristics desired for the horn.

The axes x and y and the dimensions r, d, and L from the foregoing equations are shown in FIG. 3 which is a diagrammatic end view representation of the ultrasonic rotary horn of the present invention used to make measurements of acoustical and mechanical properties as described hereinafter.

The present invention is further described by the examples which follow. Such examples, however, are not to be construed as limiting in any way either the spirit or scope of the present invention.

EXAMPLE 1

Evaluation of a 20 kHz Control Horn and its Comparison with a Commercially Available Horn As stated earlier, the horn of the present invention exhibits acoustical and mechanical properties which are similar to the horn of application Ser. No. 525,523. It therefore is appropriate to establish the nature of such acoustical and mechanical properties and to compare them with the properties of a commercially available horn. For convenience, such properties will be established by a horn coming within the scope of application Ser. No. 525,523, such horn being referred to hereinafter as a "control horn." The commercially available horn is the Mecasonic horn described earlier.

Figure 4:
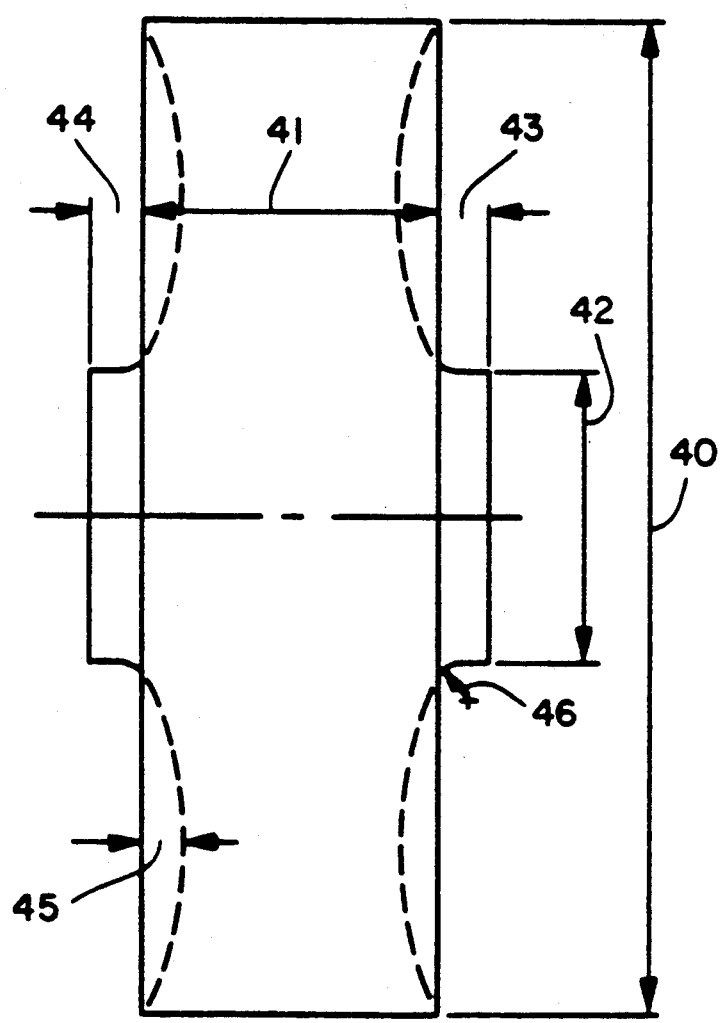
FIG. 4 is a diagrammatic side-view representation of a control ultrasonic rotary horn and illustrates the dimensional parameters of the horn.

In order to measure the acoustical and mechanical properties of a control horn, a horn similar to that shown in FIG. 4 was machined from a solid piece of titanium; although not shown, the ends included threaded studs which were integral parts of the horn. The horn was intended to be excited at a frequency of about 20 kHz. The radial surface was about 5.1 cm wide and the horn had a diameter of about 17.1 cm. The ends of the horn were identical (i.e., they were mirror images of each other). Each end had a cylindrical hub, the face of which was about 5.1 cm in diameter. The hub had a shoulder which was parallel with both the radial surface and the rotational axis of the horn; the shoulder had a length of about 7 mm. Protruding from each hub concentric with the rotational axis of the horn was a threaded stud having a diameter of about 13 mm (not shown).

The actual dimensions in mm of the horn are shown in Table 1 with reference to FIG. 4 which is an end view representation of the horn, except for the studs which are not shown. In addition, the concave portions of the ends of the horn of FIG. 4 actually had a second order profile which is not shown, the coefficients a and b having the value 0.5356 and −0.1289, respectively (for convenience, the concave portions of the ends in the drawing have circular profiles). The horn had a mass of 4.640 kg (all mass measurements were made with a Mettler Model PE16 electronic balance, Mettler Instrument Corp., Hightstown, N.J.).

TABLE 1

| Dimensions of the 20 kHz Horn of FIG. 4 | |
|---|---|
| Dimension | Value (mm) |
| 40 | 170.69 |
| 41 | 50.80 |
| 42 | 50.80 |
| 43 | 8.89 |
| 45 | 6[a] |
| 46 | 2.54 |

[a]Approximate value.

Figure 5:
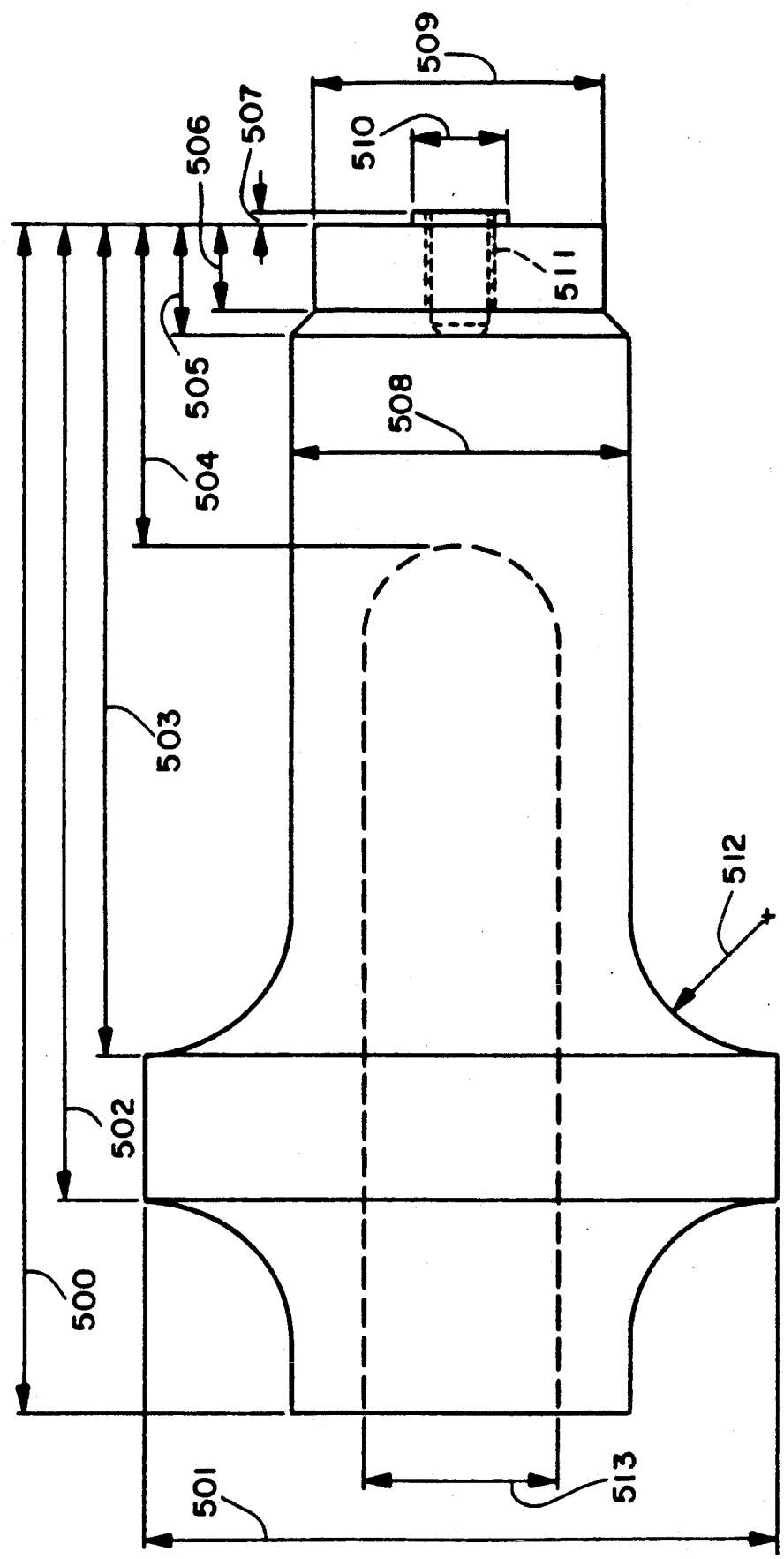
FIG. 5 is a diagrammatic side-view representation of a commercially available ultrasonic rotary horn which identifies the dimensional parameters of the horn.

Because similar measurements were desired for the Mecasonic horn, the horn employed (Model No. 2994) is represented by FIG. 5 which is a side view representation of the Mecasonic horn illustrating the dimensional parameters. The actual dimensions in mm are shown in Table 2. The horn had a mass of 4.668 kg.

TABLE 2

| Dimensions of the Mecasonic Horn of FIG. 5 | |
|---|---|
| Dimension | Value (mm) |
| 500 | 242.14 |
| 501 | 130.18 |
| 502 | 199.87 |
| 503 | 170.03 |
| 504 | 63.58 |
| 505 | 22.71 |
| 506 | 17.30 |
| 507 | 2.01 |
| 508 | 69.95 |
| 509 | 59.84 |
| 510 | 21.95 |
| 511 | —[a] |
| 512 | 30.07 |
| 513 | 41.99 |

[a]M16 × 2 tap, 22.73 mm deep.

Figure 6:
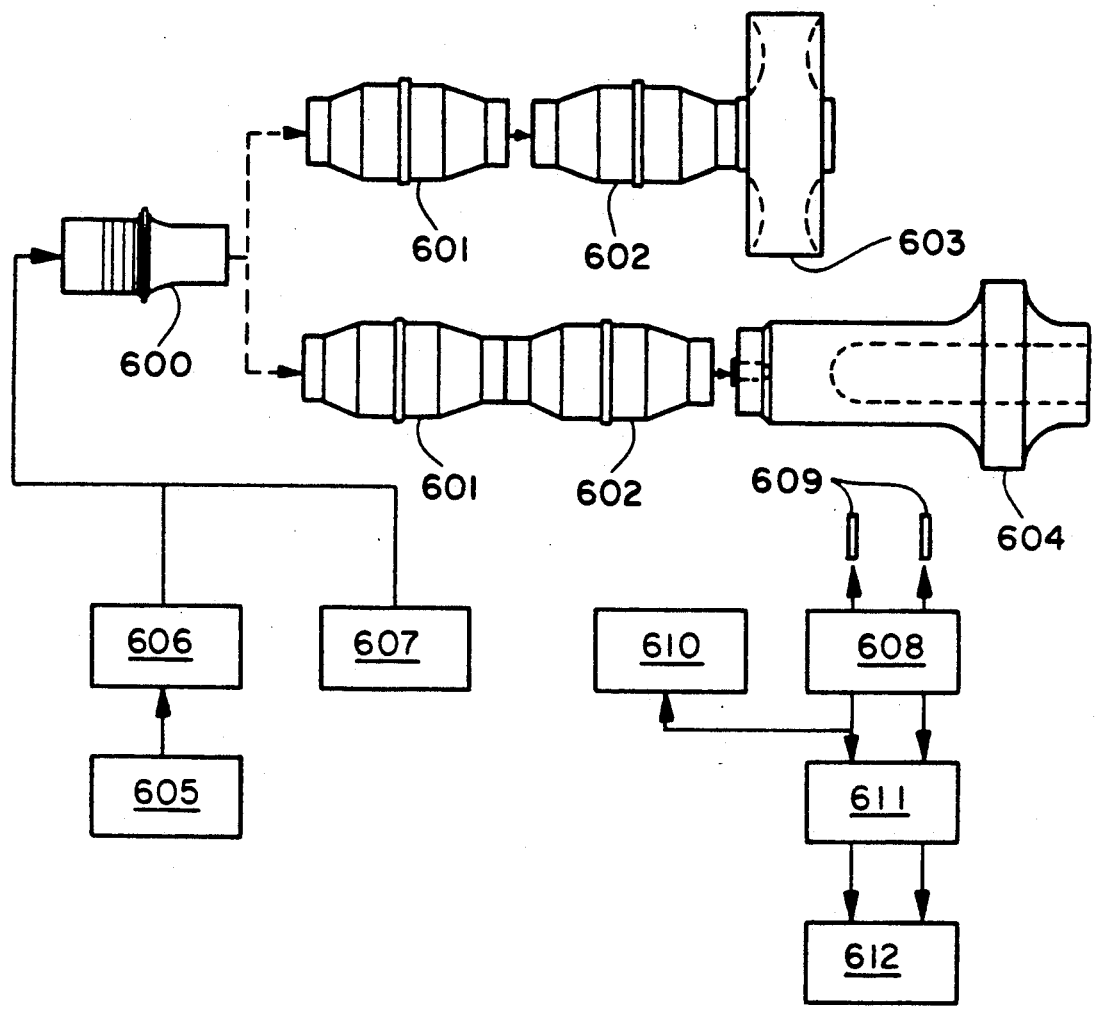
FIG. 6 is a diagrammatic representation of the experimental set-up and equipment required to measure the acoustical and mechanical properties of the horns represented by FIGS. 4 and 5.

The experimental set-up for such measurements is shown in FIG. 6 which includes a diagrammatic representation of the arrangement of the driver assembly, boosters, and horns. In each case, longitudinal displacement of a horn was accomplished by means of a piezoelectric transducer consisting of barium titanate ceramic in the conventional form of a half-wave resonator, i.e., Dukane driver assembly 600 (Part. No. 110-3123, Dukane Corporation, St. Charles, Ill.). Driver assembly 600 was attached to a 1:1 booster 601, such as the Dukane booster (Part No. 2177T) or its equivalent. Booster 601 in turn was attached to a 2:1 booster 602, such as the Dukane booster (Part No. 2181T) or its equivalent. Booster 602 was attached to either the control horn 603 or the Mecasonic horn 604.

In addition, FIG. 6 also shows schematically the auxiliary equipment required by the test procedure. Generator 605 (a Dukane 1800-watt, 20-KHz generator, Part No. 20A1800) was connected to power meter 606 (Sonic Systems Model M1/SC3 Wattmeter, Sonic Systems, Inc., Newtown, Pa.). Power meter 606 was connected to driver assembly 600. Also connected to driver assembly 600 was horn analyzer 607 (Dukane Horn Analyzer, Part No. 40A350). Displacement measuring system 608 having probes 609 (Kaman Model KD4200-1S1/1S2 SPL Displacement Measuring System, Kaman Instrumentation Corp., Colorado Springs, Colo.) was used to measure displacements at various points on each horn as described hereinafter. System 608 was connected to frequency counter 610 (B & K Precision Model 1822 Universal Counter, B & K Dynascan Corp., Chicago, Ill.) and to analog filter 611 (Wavetek Model 452 Dual Channel Hi/Lo Analog Filter, Wavetek San Diego, Inc., San Diego, Calif.). Filter 611 in turn was connected to oscilloscope 612 (Tektronix Model 5223 Digitizing Oscilloscope, Tektronix, Inc., Beaverton, Oreg.).

In some of the later experiments, some of the components shown in FIG. 6 were replaced with equivalent equipment from Branson Sonic Power Company (Danbury, Conn.), i.e., DuKane driver assembly 600, generator 605, and either or both of boosters 601 and 602. Such replacements, however, did not significantly affect either the method or the results obtained.

Figure 7:
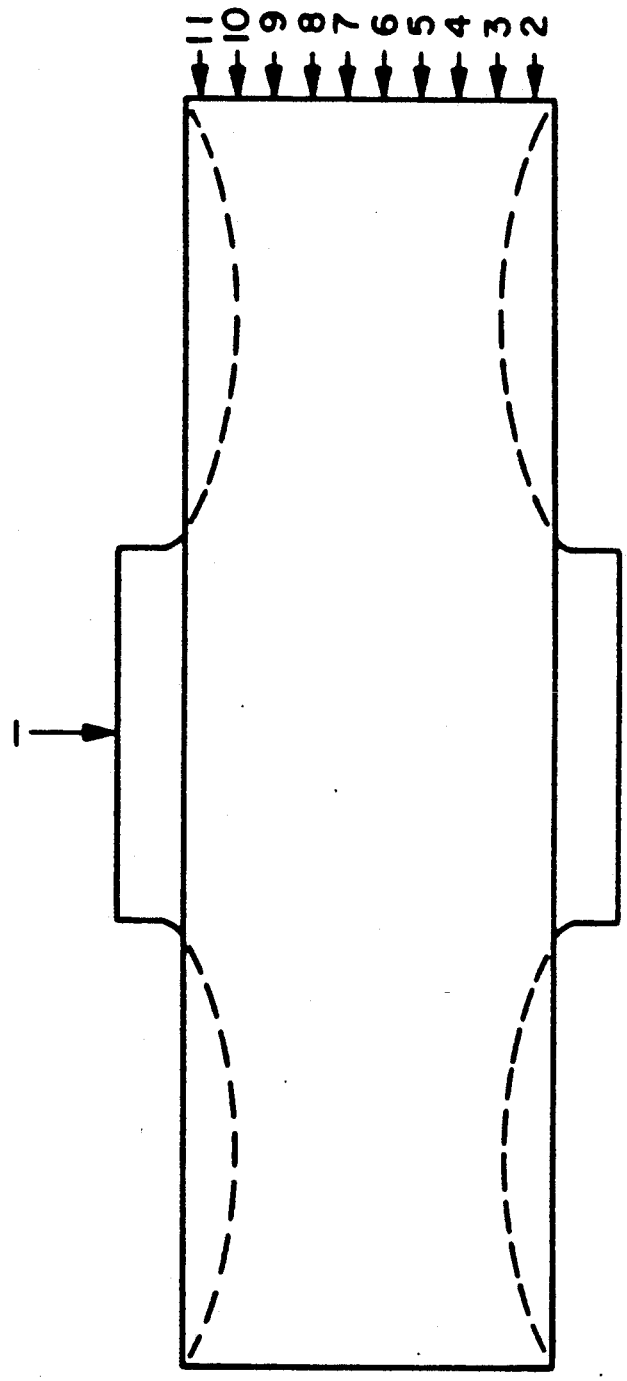
FIGS. 7 and 8 illustrate the points at which measurements were taken to determine the acoustical and mechanical properties of the horns represented by FIGS. 4 and 5, respectively.
Figure 8:
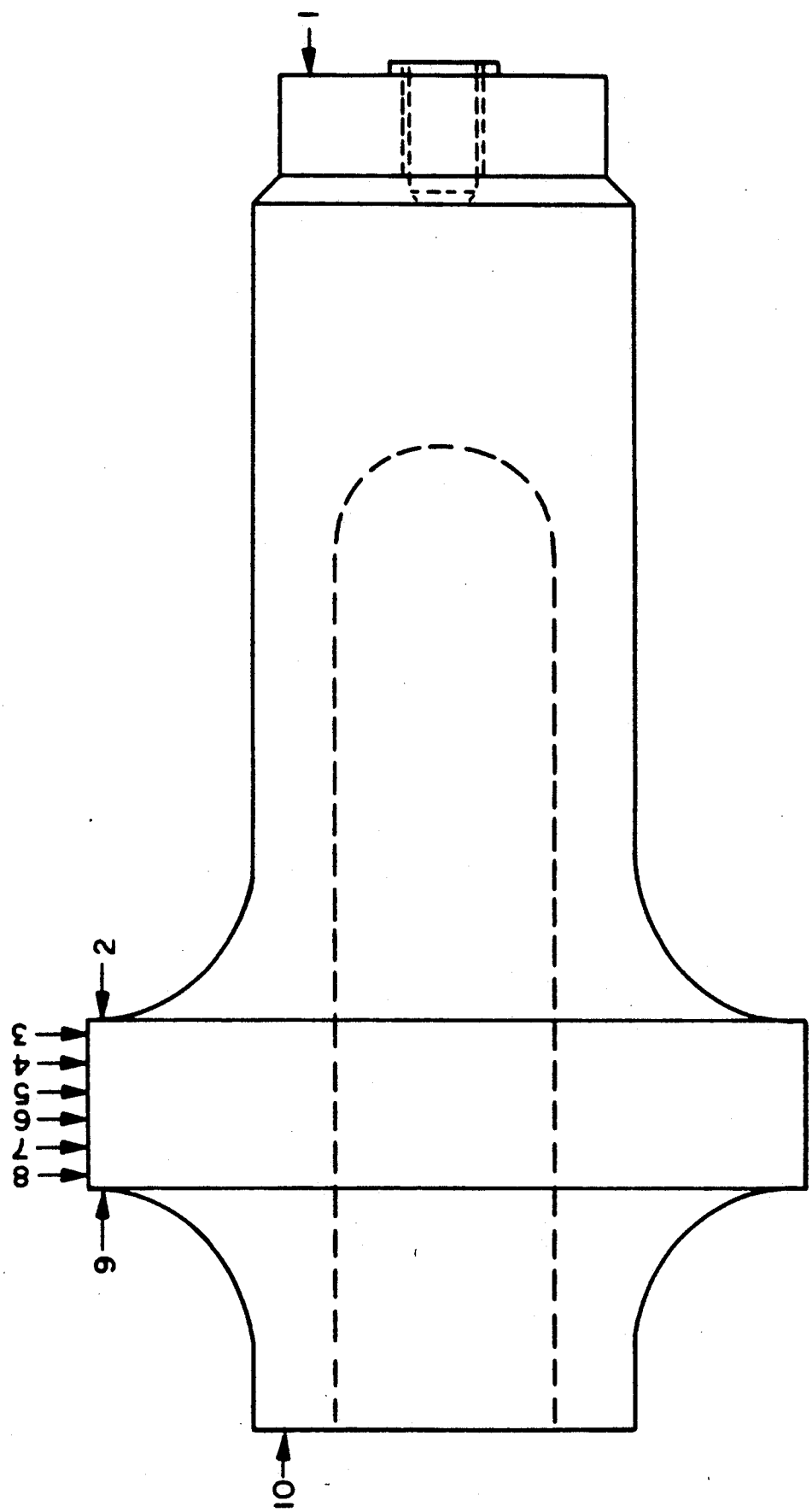

The driver assembly, boosters, and horn under test were configured as shown in FIG. 6. The system was excited by means of the horn analyzer to determine the resonant frequency of the system. The generator then was activated and the system excited for one minute to allow the system to stabilize. After the stabilization period, one displacement measuring probe was placed at the excitation input to the horn and the other probe was placed at appropriate consecutive points, primarily along the radial surface of the horn. The locations of the displacement measuring probes are shown diagrammatically in FIGS. 7 and 8 for the control horn and the Mecasonic horn, respectively. In each case, point 1 represents the point of excitation input (or longitudinal excitation). With the generator on, the amplitude level, amplitude phase relative to point 1, power consumption, and frequency were recorded at each of points 2-11, inclusive, on the control horn (FIG. 7) and points 2-10, inclusive, on the Mecasonic horn (FIG. 8). Each of points 2 and 11 on the control horn and points 3 and 8 on the Mecasonic horn were located approximately 2.5 mm from the nearest edge of the radial surface, i.e., the edge nearest the excitation source. In addition, each point on the radial surface of each horn was about 5 mm from adjacent points. The data obtained with the control horn are summarized in Table 3 and the data for the Mecasonic horn are summarized in Table 4. The resonant or horn analyzer frequencies for the two horns were 20,003 and 19,928 Hz, respectively.

TABLE 3

Summary of data for the 20 kHz Control Horn at an Excitation Power of 150 Watts

| Point | Phase[a] | Amplitude (microns) | Horn Gain[b] | Effic.[c] | Frequency (Hz) |
|---|---|---|---|---|---|
| 1 | — | 34.0 | — | 0.23 | 20,003 |
| 2 | Out | 40.6 | 1.19 | 0.27 | 20,003 |
| 3 | Out | 40.6 | 1.19 | 0.27 | 20,002 |
| 4 | Out | 40.6 | 1.19 | 0.27 | 20,001 |
| 5 | Out | 40.6 | 1.19 | 0.27 | 20,001 |

TABLE 3-continued

Summary of data for the 20 kHz Control Horn at an Excitation Power of 150 Watts

| Point | Phase[a] | Amplitude (microns) | Horn Gain[b] | Effic.[c] | Frequency (Hz) |
|---|---|---|---|---|---|
| 6 | Out | 40.6 | 1.19 | 0.27 | 20,001 |
| 7 | Out | 40.6 | 1.19 | 0.27 | 20,000 |
| 8 | Out | 40.6 | 1.19 | 0.27 | 20,000 |
| 9 | Out | 40.4 | 1.19 | 0.27 | 19,999 |
| 10 | Out | 39.9 | 1.17 | 0.27 | 19,999 |
| 11 | Out | 39.6 | 1.16 | 0.26 | 19,998 |

[a]Phase, relative to point 1.
[b]The ratio of radial amplitude to longitudinal amplitude, the latter being represented by the amplitude value of point 1.
[c]Efficiency, in microns per watt.

TABLE 4

Summary of data for the Mecasonic Horn at an Excitation Power of 220 Watts

| Point | Phase[a] | Amplitude (microns) | Horn Gain[b] | Effic.[c] | Frequency (Hz) |
|---|---|---|---|---|---|
| 1 | — | 31.2 | — | 0.14 | 19,907 |
| 2 | In | 3.8 | 0.12 | 0.02 | 19,907 |
| 3 | In | 36.8 | 1.18 | 0.17 | 19,902 |
| 4 | In | 38.6 | 1.24 | 0.18 | 19,901 |
| 5 | In | 39.6 | 1.27 | 0.18 | 19,901 |
| 6 | In | 40.1 | 1.29 | 0.18 | 19,899 |
| 7 | In | 38.1 | 1.22 | 0.17 | 19,898 |
| 8 | In | 37.1 | 1.19 | 0.17 | 19,898 |
| 9 | —[d] | —[d] | — | — | 19,906 |
| 10 | In | 47.2 | 1.51 | 0.21 | 19,901 |

[a]Phase, relative to point 1.
[b]The ratio of radial amplitude to longitudinal amplitude, the latter being represented by the amplitude value of point 1.
[c]Efficiency, in microns per watt.
[d]Measurements were below instrument sensitivity.

It should be noted that the "Phase" column in Tables 3 and 4 indicates the direction of the radial motion with respect to the longitudinal motion at the driven end, particularly with reference to FIGS. 9 and 10A, 10B and 10C.

Figure 9:
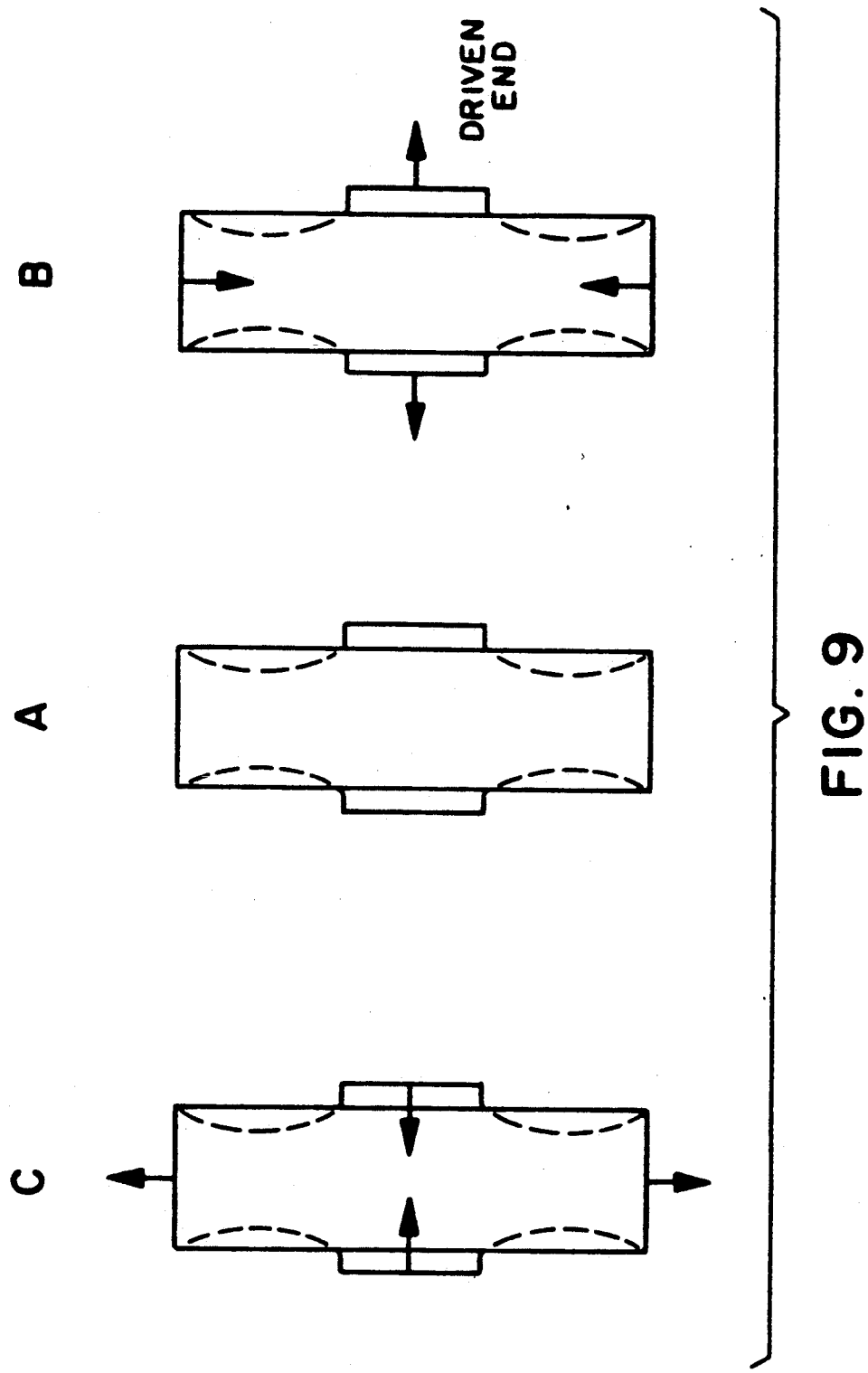
FIG. 9 illustrates the definitions for "in phase" and "out of phase" for the horn represented by FIG. 4, which definitions are employed in the descriptions of the acoustical and mechanical properties of the horn.

The terms "in phase" and "out of phase", already defined, will be more readily understood by referring to FIGS. 9 and 10A, 10B and 10C. FIG. 9 consists of three separate views of a control horn. When the horn in an unexcited state (view A) is excited and the surface of the driven end moves away from the horn, as shown in view B, the other end also moves away from the horn and the radial surface moves inwardly toward the rotational axis or the interior of the horn. When the driven end moves inwardly toward the interior of the horn, as shown in view C, the radial surface moves outwardly away from the rotational axis. These movements will be described again in relation to FIGS. 13 and 15A, 15B and 15C.

Figure 10C:
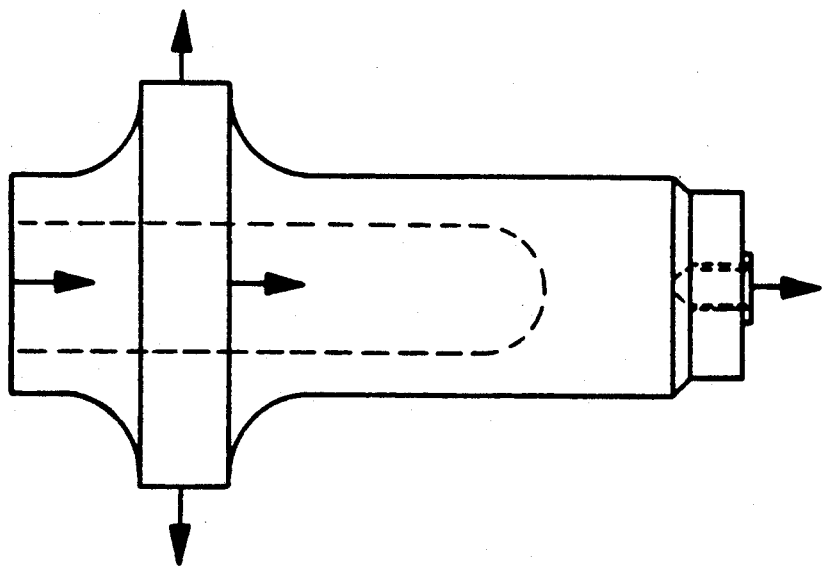
FIGS. 10A, 10B, and 10C illustrate the definitions for "in phase" and "out of phase" for the horn represented by FIG. 5, which definitions are employed in the descriptions of the acoustical and mechanical properties of the horn.
Figure 10A:
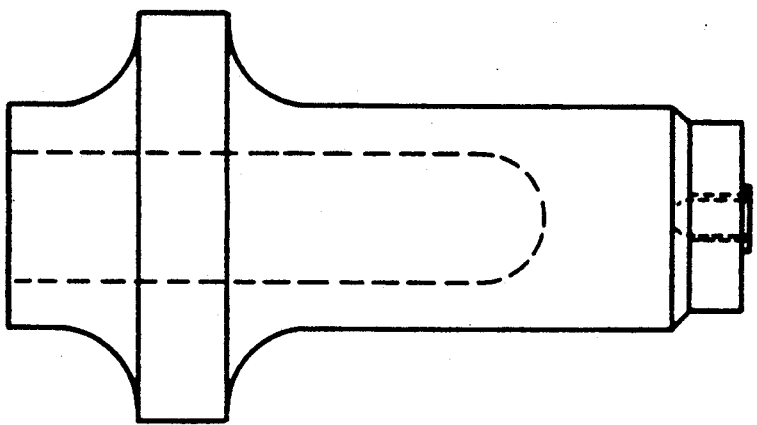
Figure 10B:
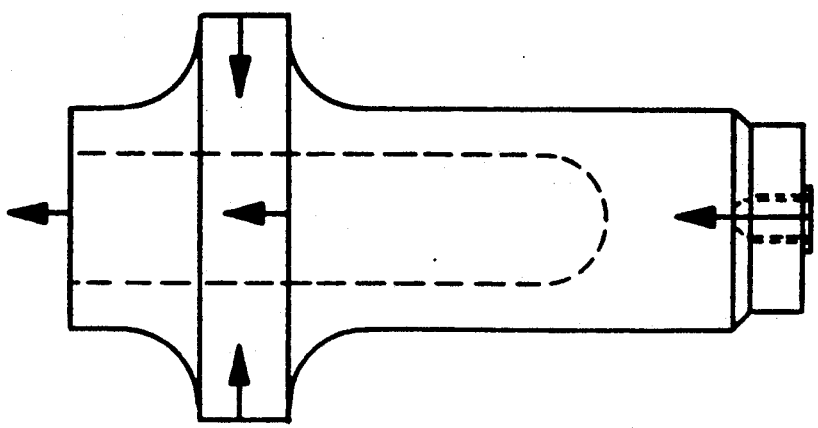

Similarly, FIGS. 10A, 10B, and 10C represent three separate views of the Mecasonic horn. As with FIG. 9, FIGS. 10B and 10C show the movements of both the longitudinal and radial surfaces relative to each other when the horn is excited. When the horn in an unexcited state (FIG. 10A) is excited and the surface of the driven end moves away from the horn, as shown in FIG. 10C, the radial surface moves away from the rotational axis. When the driven end moves inwardly toward the interior of the horn, the radial surface also moves inwardly toward the interior of the horn, or towards the rotational axis (FIG. 10B). The arrow at one edge of the radial surface in FIGS. 10B and 10C shows that the radial surface also moves longitudinally in the same direction as the driven end. In fact, the entire horn moves longitudinally in the same direction as the driven end. These movements will be described again in relation to FIGS. 14 and 16A, 16B, and 16C.

In view of Tables 3 and 4, the following points may be noted, of which the first is by far the most significant:

(1) when subjected to longitudinal mechanical excitation at the resonant frequency, the 20 kHz control horn displayed radial displacement which acted symmetrically about the median plane of the horn, while that of the Mecasonic horn decreased significantly on either side of the radial antinode plane, and the radial displacement along the entire width of the radial surface of the horn of the present invention was out of phase with the longitudinal displacement, whereas the radial displacement along the width of the radial surface of the Mecasonic horn was in phase with the longitudinal displacement;

(2) the power requirement for the 20 kHz control horn was lower than that for the Mecasonic horn; and (3) the amplitude profile across the width of the radial surface of the 20 kHz control horn was more constant than that of the Mecasonic horn.

To more easily visualize point 3 above, the amplitude values obtained (see Tables 3 and 4) were plotted versus the distance of each point from the driven end of the horn, i.e., the end to which the boosters and driver assembly were attached. These plots are shown in FIG. 11, in which curve A is for the 20 kHz control horn and curve B is for the Mecasonic horn.

Figure 11:
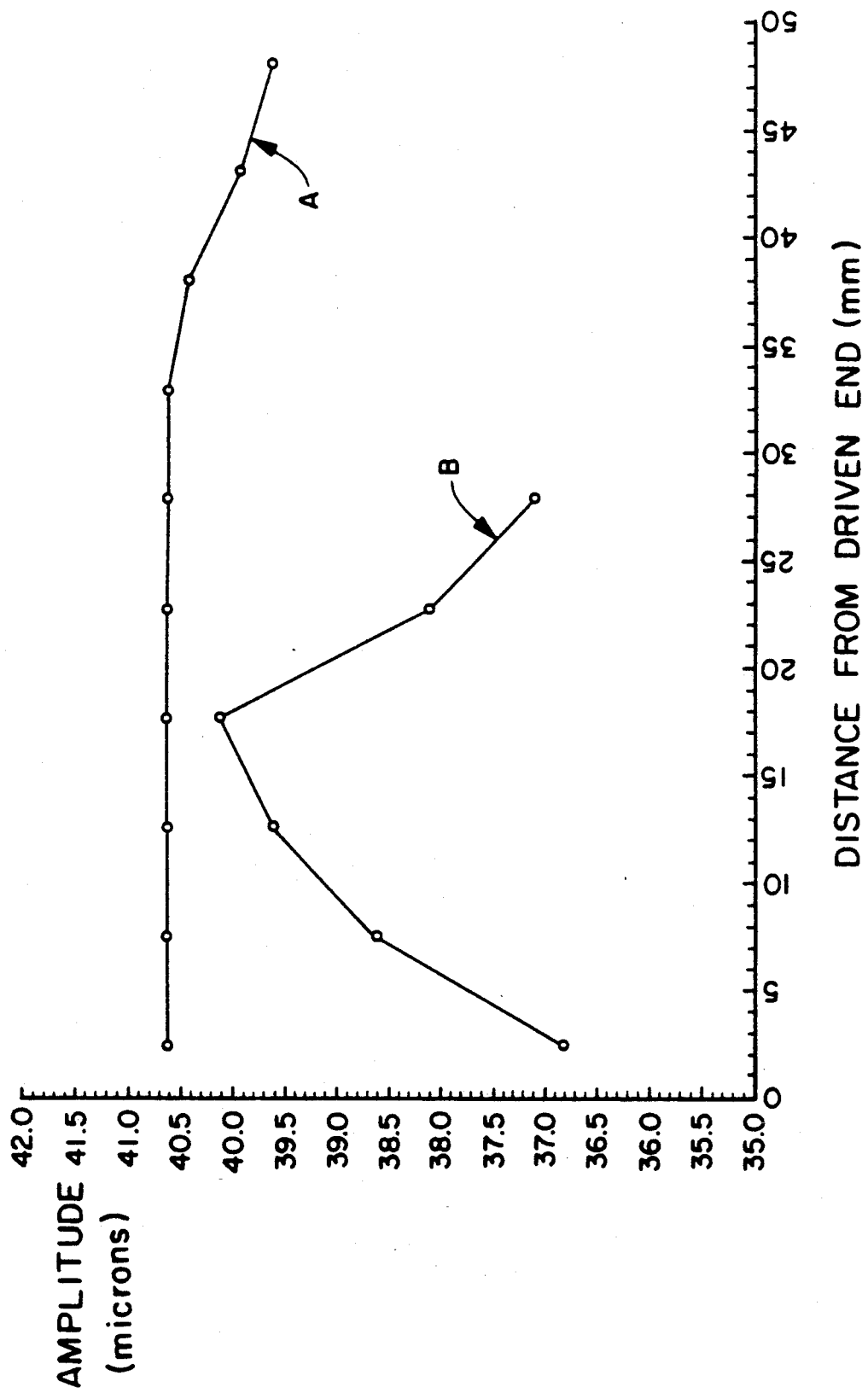
FIG. 11 consists of the plots of the radial amplitude profiles of the radial surfaces of the ultrasonic rotary horns represented by FIGS. 4 and 5.

FIG. 11 dramatically demonstrates the difference in amplitude profile across the face of the radial surface between the two horns. The amplitude profile of the 20 kHz control horn is relatively flat across the width of the radial surface. That is, the lowest amplitude measured across the radial surface was never less than about 97 percent of the maximum amplitude measurement. The amplitude profile of the Mecasonic horn, on the other hand, shows a peak at about 28 mm from the driven end, with the amplitude decreasing significantly on either side of the peak, especially on the side farthest from the driven end. Based on the data in Tables 3 and 4, the percent variance values for the control horn and the Mecasonic horn are 2.5 and 8.2, respectively.

It may noted from Tables 3 and 4 that the amplitude values for the Mecasonic horn generally were not significantly different from those for the control horn. However, the amplitudes observed with the Mecasonic horn were the result of a higher excitation power. The excitation power used with the Mecasonic horn actually was 1.49 times that used with the control horn. If the Mecasonic horn performed as well as the 20 kHz control horn, the amplitude values for the Mecasonic horn should have been 1.49 times the amplitude values for the control horn, i.e., around 1.75. Because the excitation power plays such a significant role in the amplitude values measured, efficiency values are more significant than amplitude values because the former are a function of both radial amplitude and excitation power.

In order to simplify the comparison of horns run at different power levels, a power-related gain term is used throughout this specification. The term, designated PRG, is equal to horn gain divided by excitation power. In order to avoid small decimal numbers, the quotient is multiplied by $10^3$. Thus, $$PRG = (Horn\ Gain/Power)\ watts^{-1} \times 10^3$$

To illustrate the use of the term, PRG values have been calculated for both the 20 kHz control horn and the Mecasonic horn and are summarized in Table 5.

TABLE 5

| Summary of PRG Values | | | | | |
|---|---|---|---|---|---|
| Control Horn | | | Mecasonic Horn | | |
| Point | Gain | PRG[a] | Point | Gain | PRG[b] |
| 1 | — | — | 1 | — | — |
| 2 | 1.19 | 7.9 | 2 | 0.12 | 0.5 |
| 3 | 1.19 | 7.9 | 3 | 1.18 | 5.4 |
| 4 | 1.19 | 7.9 | 4 | 1.24 | 5.6 |
| 5 | 1.19 | 7.9 | 5 | 1.27 | 5.8 |
| 6 | 1.19 | 7.9 | 6 | 1.29 | 5.9 |
| 7 | 1.19 | 7.9 | 7 | 1.22 | 5.5 |
| 8 | 1.19 | 7.9 | 8 | 1.19 | 5.4 |
| 9 | 1.19 | 7.9 | 9 | — | — |
| 10 | 1.17 | 7.8 | 10 | 1.51 | 6.7 |
| 11 | 1.16 | 7.7 | | | |

[a]Power-related gain, in watts$^{-1} \times 10^3$, at 150 watts excitation power.
[b]Power-related gain, in watts$^{-1} \times 10^3$, at 220 watts excitation power.

From an inspection of Table 5 and the respective PRG values, it is more clearly evident that the 20 kHz control horn performs significantly better than the Mecasonic horn. Note that a horn gain of 1.19 with the 20 kHz control horn gives a PRG of 7.9 watts$^{-1} \times 10^3$, whereas the same gain value for the Mecasonic horn gives a PRG of only 5.4 watts$^{-1} \times 10^3$.

Further comparison of the performances of the two horns requires the compilation of some average values, as well as some additional information. In each case, the amplitude value at point 1 was taken as the input amplitude. An average radial amplitude, i.e., the average amplitude across the radial surface, was calculated from the amplitude values at points 2-11, inclusive, for the 20 kHz control horn and points 3-8, inclusive, for the Mecasonic horn. That is, the average radial amplitude was the quotient of the sum of amplitude values for each point across the radial surface divided by the number of points. The average horn gain in each case was the ratio of the average radial amplitude to the input amplitude. These average values, along with the average power and the width of the radial surface, average PRG value, and a calculated "performance factor" ("PF") for each horn, are summarized in Table 6. The PF, a summary index of performance, is a convenient means for comparing the efficiency of rotary bonding horns. The PF, as employed herein, is defined as the average radial amplitude divided by the average electrical power consumed per unit radial surface width. Thus, the PF is the average radial amplitude divided by the power per unit radial surface width and will have the units, microns watts$^{-1}$ mm. It is equivalent to efficiency per unit radial surface width. It should be apparent that the larger the value of the PF, the greater the potential for a horn to bond greater thicknesses of materials over a larger area for the power consumed.

TABLE 6

| Summary of Average Values and Other Information for the Control Horn and the Mecasonic Horn | | |
|---|---|---|
| Item | Control Horn | Mecasonic Horn |
| Input amplitude (microns) | 34.0 | 31.2 |
| Average radial amplitude (microns) | 40.4 | 38.4 |
| Average horn gain | 1.19 | 1.23 |
| Average power (watts) | 150 | 220 |
| Average PRG (watts$^{-1} \times 10^3$) | 7.9 | 5.6 |
| Radial surface width (mm) | 50.8 | 29.8 |

TABLE 6-continued

Summary of Average Values and Other Information for the Control Horn and the Mecasonic Horn

| Item | Control Horn | Mecasonic Horn |
|---|---|---|
| Performance factor (microns watts$^{-1}$ mm) | 13.7 | 5.2 |

As shown by Table 6, the 20 kHz control horn had a PF of 13.7 microns watts$^{-1}$ mm, whereas the Mecasonic horn exhibited a PF of 5.2 microns watts$^{-1}$ mm. This represents a significant improvement in performance by the control horn over the Mecasonic horn, even though both horns had approximately equivalent horn gains. Such improvement also is shown by the average PRG values of 7.9 watts$^{-1} \times 10^3$ and 5.6 watts$^{-1} \times 10^3$ for the control horn and the Mecasonic horn, respectively.

EXAMPLE 2

Determination of the Mode Shapes of the Horns of Example 1

From the discussion thus far, it is evident that the control horn functions in a manner which is different from that of the Mecasonic horn. In order to more fully understand the operating characteristics of the two horns, their mode shapes were determined experimentally.

Figure 12:
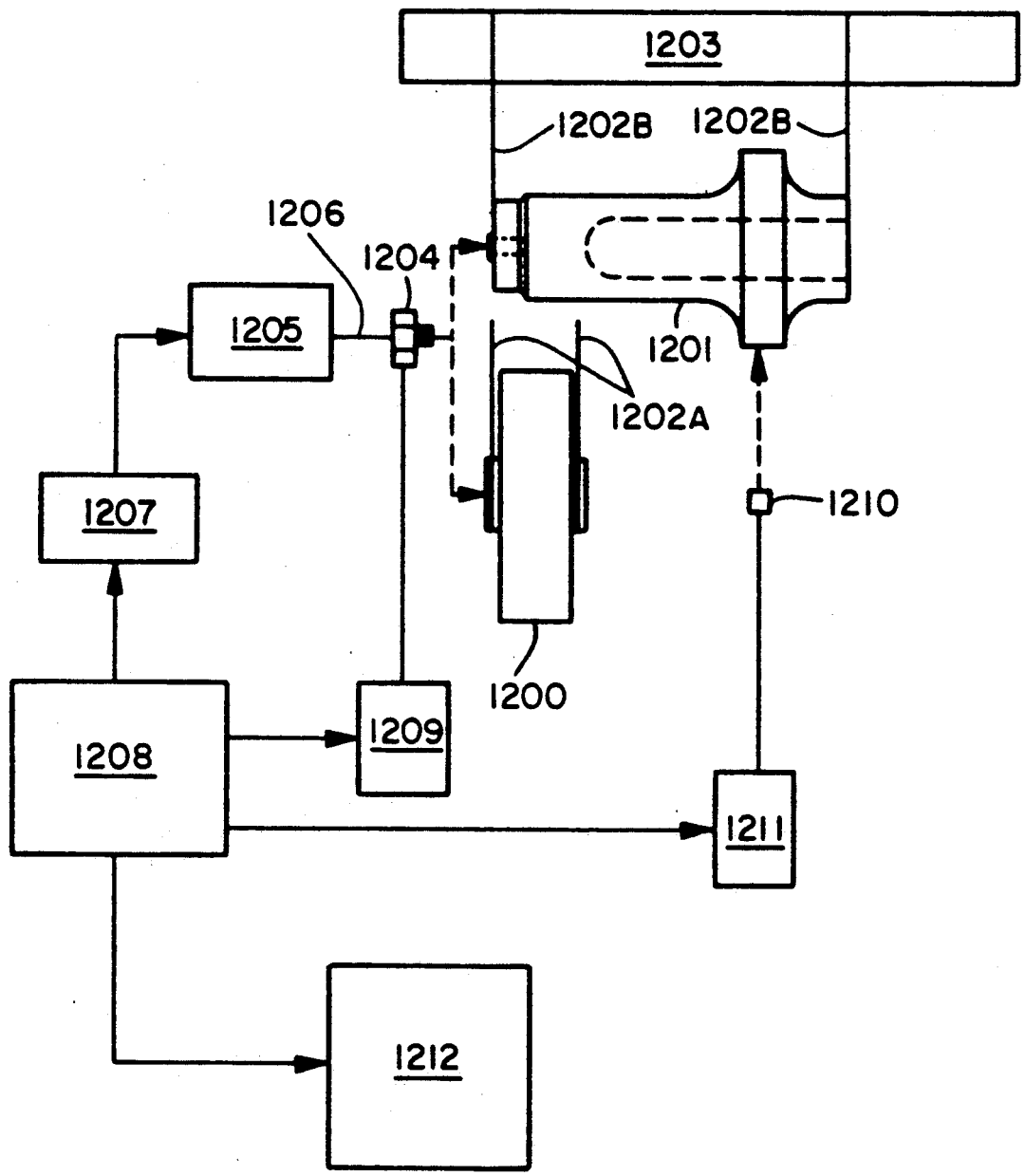
FIG. 12 is a diagrammatic representation of the experimental set-up and equipment required to determine the mode shapes of the horns represented by FIGS. 4 and 5.

In order to carry out the modal analysis, the experimental set-up illustrated by FIG. 12 was employed. Depending upon the horn to be tested, the 20 kHz control horn 1200, or the Mecasonic horn 1201, was suspended by wires 1202A or wires 1202B, respectively, from support 1203. The equipment consisted of a Bruel and Kjaer Modal Analysis System (Bruel and Kjaer Instruments, Inc., Hoffman Estates, Ill.) in conjunction with a Hewlett-Packard HP9000-217 computer (Hewlett-Packard Company, Ft. Collins, Colo.). Specifically, Bruel and Kjaer Type 8200 Force Transducer 1204 was bolted to the horn under test at the input face. Force Transducer 1204 was connected to Bruel and Kjaer Type 4809 Vibration Exciter 1205 by means of 7.6-cm long, 3.2-mm diameter nylon rod 1206. Vibration Exciter 1205 was driven by Bruel and Kjaer Type 2606 Power Amplifier 1207 which in turn received its signal from Bruel and Kjaer Type 2032 Dual Channel Signal Analyzer 1208. Force Transducer 1204 also was connected to a first Bruel and Kjaer Type 2635 Charge Amplifier 1209 which in turn was connected to Signal Analyzer 1208. Just as the Force Transducer 1204 measured the frequency and force amplitude of the excitation energy being applied to the horn, the output acceleration amplitude and frequency at the radial surface of the horn were measured by Bruel and Kjaer Type 4374 Accelerometer 1210 which was connected to a second Bruel and Kjaer Type 2635 Charge Amplifier 1211. Finally, Signal Analyzer 1208 was connected to the Hewlett-Packard computer 1212.

Figure 13:
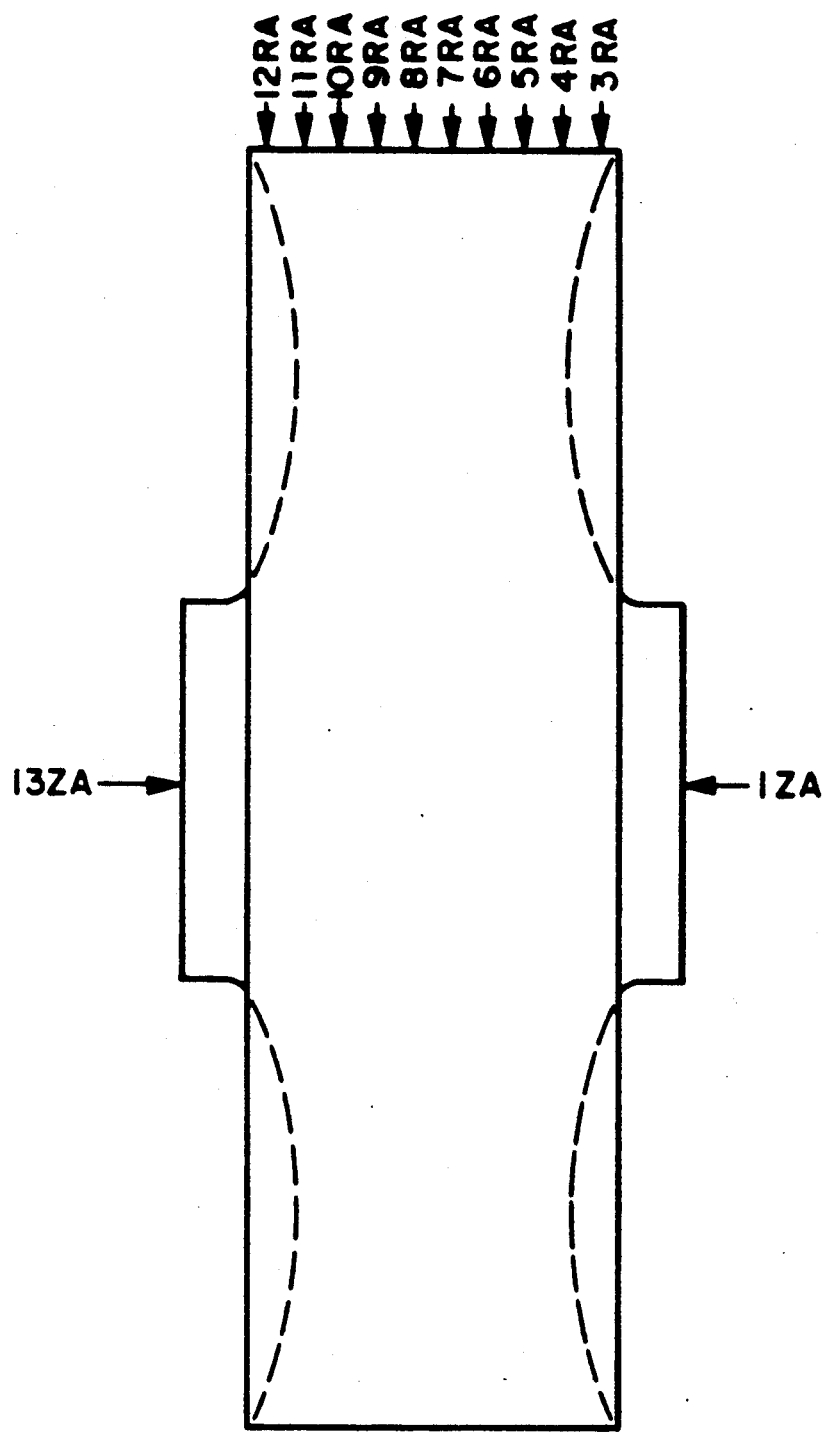
FIGS. 13 and 14 illustrate the points at which measurements were taken to determine the mode shapes of the horns represented by FIGS. 4 and 5, respectively.
Figure 14:
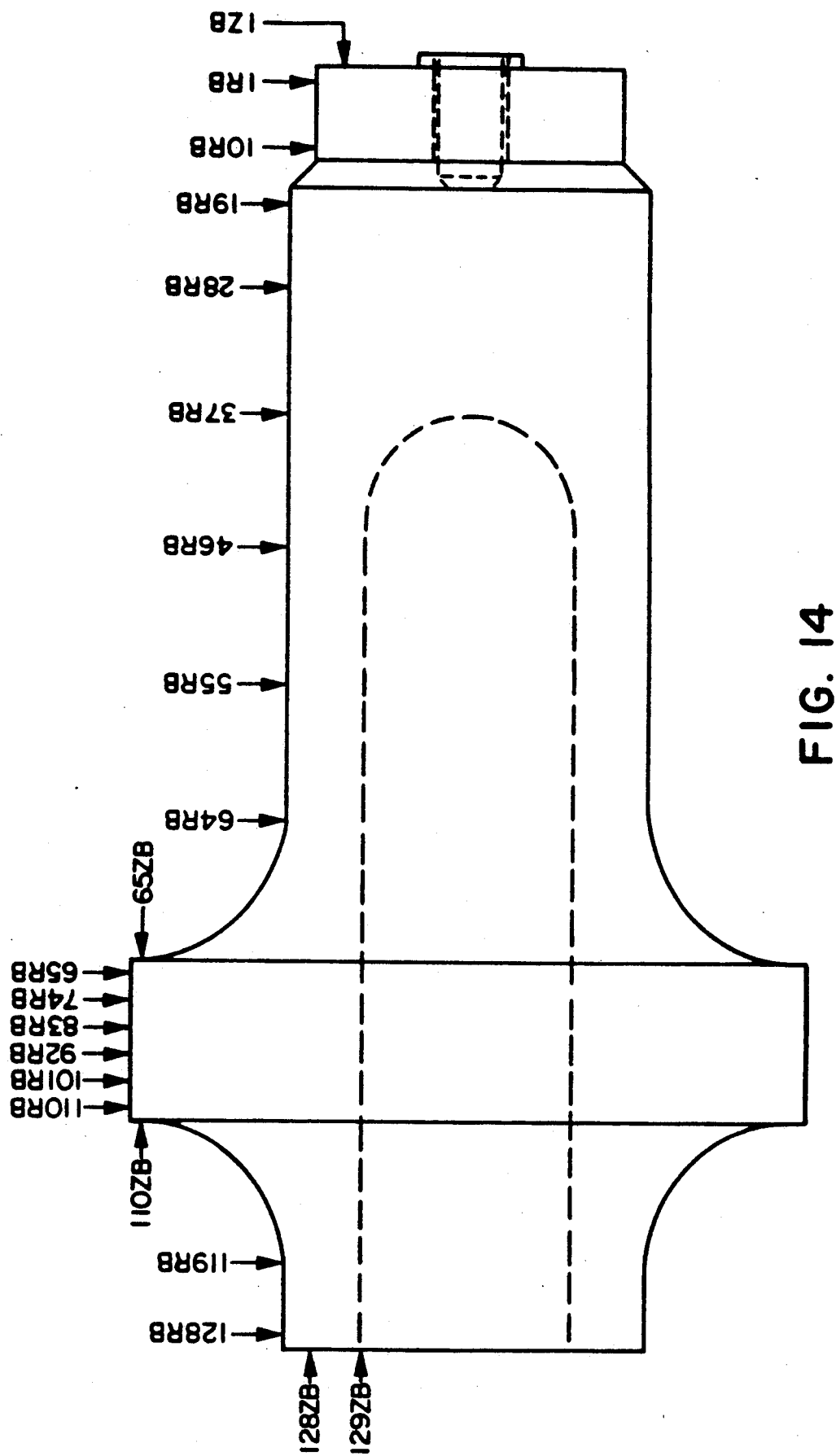

Referring now to FIGS. 13 and 14, the Accelerometer 1210 was placed on the horn at the input. The input is represented by point IZA in FIG. 13 for the 20 kHz control horn and point IZB in FIG. 14 for the Mecasonic horn. A measurement was taken at that point for each horn while exciting the horn with random noise. Subsequent measurements then were taken at the other points indicated in FIGS. 13 and 14 for the control horn and the Mecasonic horn, respectively. As measurements were taken, the data obtained were transferred to Hewlett-Packard computer 1212 which, upon completion of the measurement process, was used to calculate and illustrate the mode shapes of the two horns.

Figure 15C:
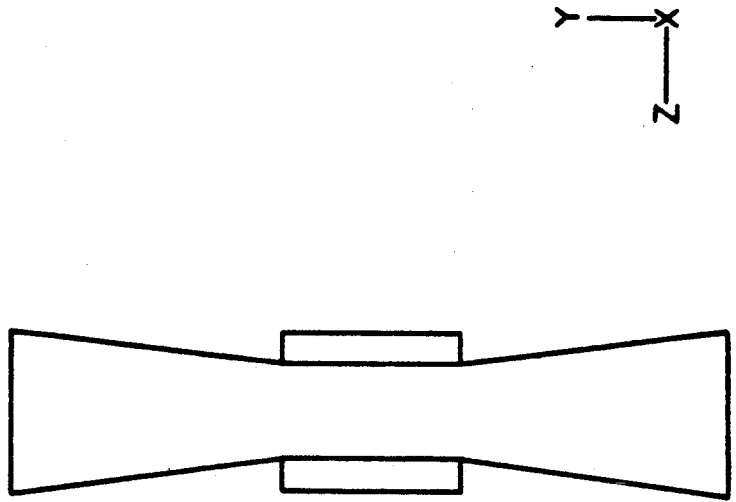
FIGS. 15A, 15B, and 15C together comprise a two-dimensional, diagrammatic representation of the mode shape of the horn represented by FIG. 4.
Figure 15A:
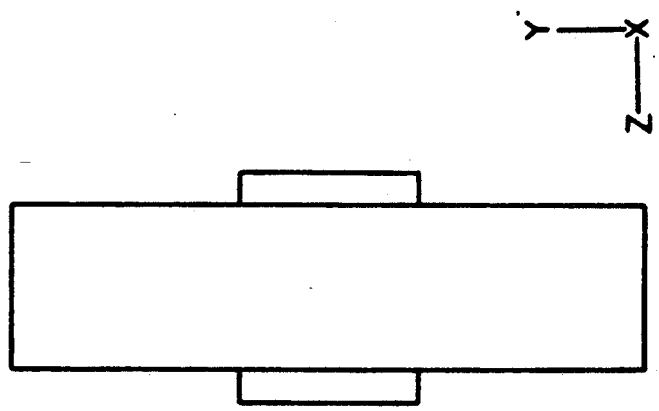
Figure 15B:
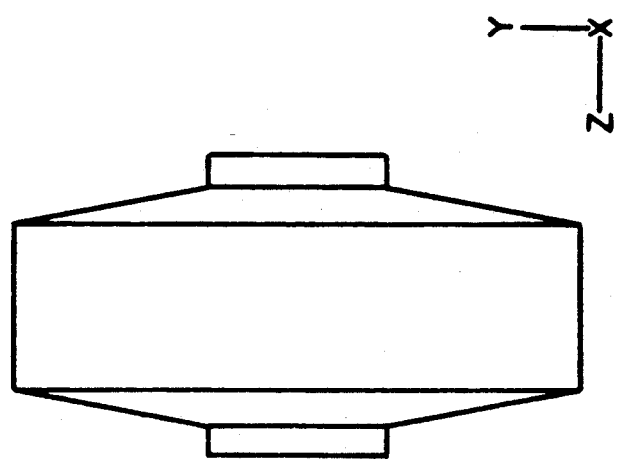
Figure 16C:
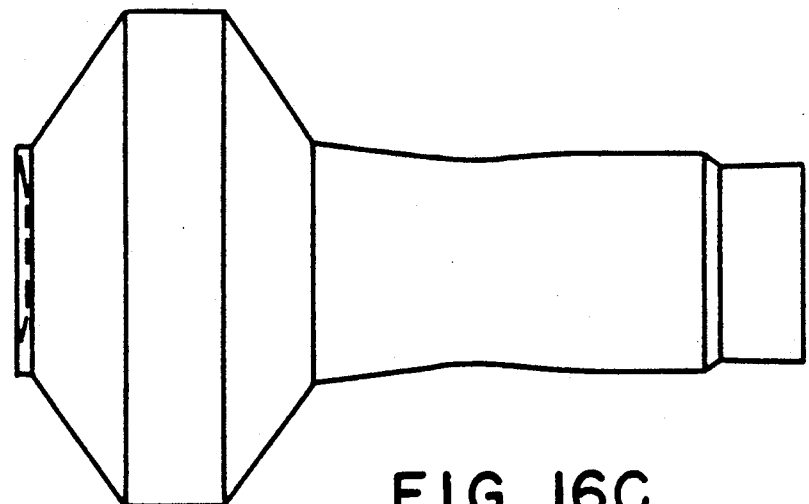
FIGS. 16A, 16B, and 16C together comprise a two-dimensional, diagrammatic representation of the mode shape of the horn represented by FIG. 5.
Figure 16A:
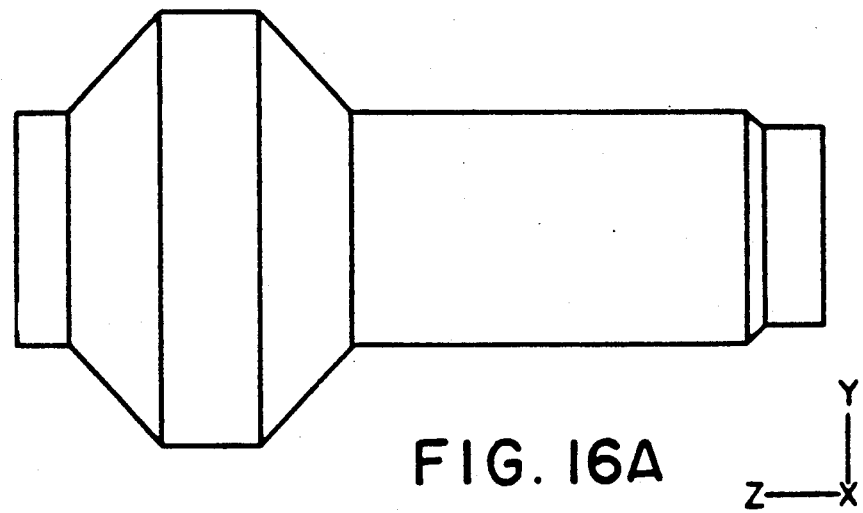
Figure 16B:
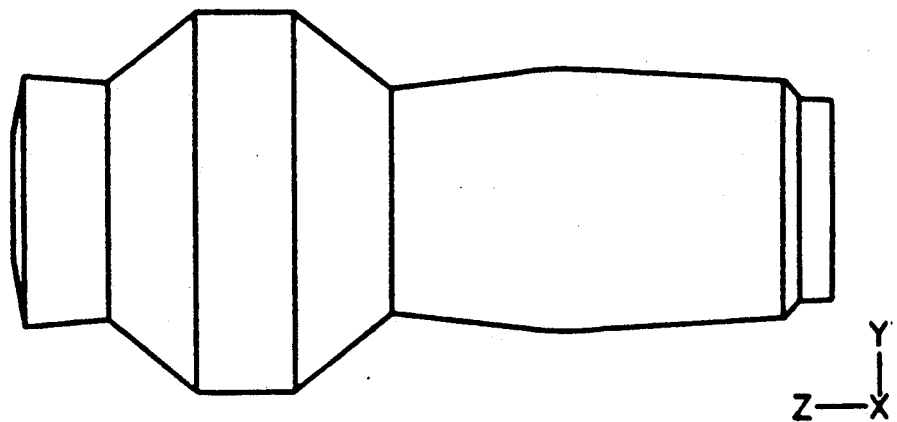

The mode shapes of the 20 kHz control horn and the Mecasonic horn are illustrated by FIGS. 15A, 15B, and 15C, and FIGS. 16A, 16B, and 16C, respectively. Each of FIGS. 15A and 16A represents the undeformed or unexcited horn. Each of FIGS. 15B and 16B represent the deformed horn where the radial amplitude at the radial surface is at a minimum, and each of FIGS. 15C and 16C represent the deformed horn where the radial amplitude at the radial surface is at a maximum. Under the influence of longitudinal excitation, the control horn expands and contracts in concertina or accordion fashion, with the ends moving away from and toward each other along the longitudinal or rotational axis. As the ends move away from each other, the diameter of the horn at the radial surface contracts. As the ends move toward each other, the diameter of the horn at the radial surface expands. Recalling FIG. 9, it will be noted that the motions of both the other end and the radial surface are out of phase with respect to the motion of the driven end. The practical consequence of such motions is a more uniform amplitude across the radial surface.

The Mecasonic horn, however, behaves very differently under the influence of longitudinal excitation. From FIGS. 10A, 10B and 10C, and 16A, 16B and 16C, it is seen that the motions of both the other end and the radial surface are in phase with respect to the motion of the driven end. As already noted, the radial amplitude decreases significantly on either side of the antinodal plane.

In viewing FIGS. 15A, 15B and 15C, and 16A, 16B and 16C, however, it should be kept in mind that the representations are not exact because of the limited number of points at which measurements were made. In addition, a straight-line relationship was assumed to exist between adjacent points, an assumption which may or may not be correct. While the figures are of value, no attempt should be made to interpret them as being precise representations of complete horn geometry.

EXAMPLE 3

Evaluation of a 20 kHz Horn of the Present Invention

By means of the procedures already described, a more limited amount of performance data was obtained for a 20 kHz ultrasonic rotary horn of the present invention. The horn and integral elongated waveguide of standard design were machined from a solid piece of titanium. The integral waveguide had a gain of 2:1. The actual horn dimensions are given in Table 7 with reference to FIG. 17 which is an end view representation of the horn, except for the integral elongated waveguide which is not shown. The curved portions of the ends had a parabolic profile as described earlier; the value of "a" was 0.1. The calculated value of the mass of the horn, exclusive of the integral elongated waveguide, was 4.10 kg.

TABLE 7

Figure 17:
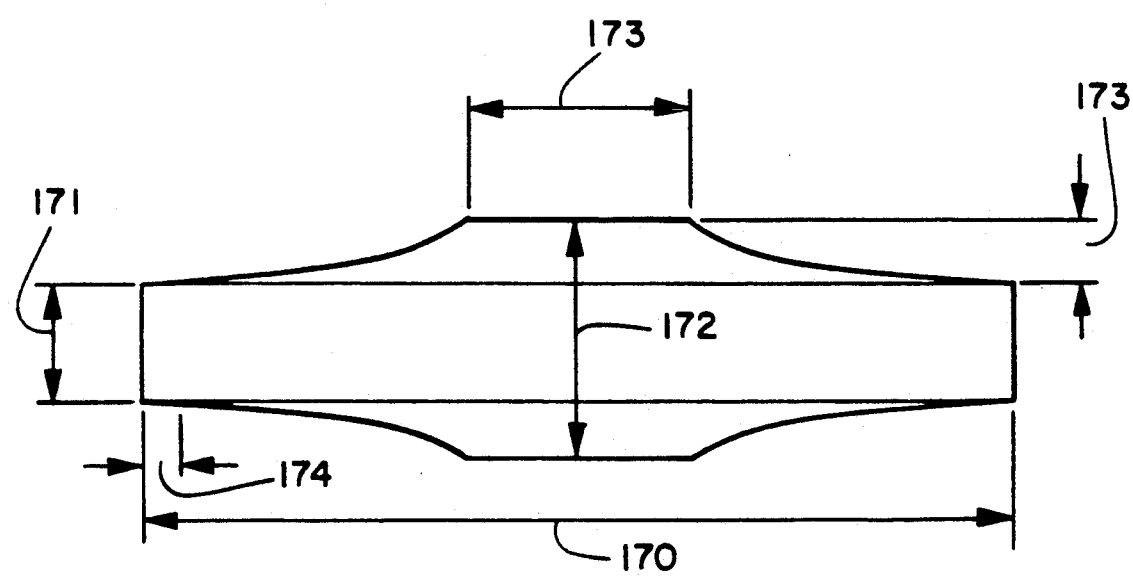
FIG. 17 is a diagrammatic side-view representation of one embodiment of a high efficiency ultrasonic rotary horn of the present invention illustrating the dimensional parameters of the horn.

| Dimensions of the 20 kHz Horn of FIG. 17 | |
|---|---|
| Dimension | Value (mm) |
| 170 | 190.50 |
| 171 | 25.40 |
| 172 | 50.80 |
| 173 | 50.80 |

TABLE 7-continued

| Dimensions of the 20 kHz Horn of FIG. 17 | |
|---|---|
| Dimension | Value (mm) |
| 174 | 6.35 |
| 175 | 12.70 |

The measurements were made as described earlier with reference to FIG. 6. Three booster combinations were measured which differed only in the gain of the first booster, identified in FIG. 6 as 601. The gain of the first booster was 1:1, 1.5:1, and 2:1, respectively, for combinations 1, 2, and 3. In each case, the gain of the integral elongate waveguide (or second booster), equivalent to 602 in FIG. 6, was 2:1. Thus, the total gain from both boosters in each of combinations 1, 2, and 3 was 2, 3, and 4, respectively. These relationships are summarized in Table 12. The data obtained are summarized in Tables 13 and 14.

TABLE 8

Summary of Booster Combinations for the 20 kHz Horn of FIG. 17

| | Booster Gain | | |
|---|---|---|---|
| Combin. | First Booster | Second Booster | Total |
| 1 | 1 | 2 | 2 |
| 2 | 1.5 | 2 | 3 |
| 3 | 2 | 2 | 4 |

TABLE 9

Summary of Displacement Data for the 20 kHz Horn of FIG. 17

| Combin. | Power (watts) | Amplitude (microns) Radial | Amplitude (microns) Longitudinal | Horn Gain[a] | PRG[b] |
|---|---|---|---|---|---|
| 1 | 160 | 66.0 | 25.4 | 2.6 | 16.2 |
| 2 | 240 | 88.9 | 34.3 | 2.6 | 10.8 |
| 3 | 500 | 115.6 | 41.9 | 2.8 | 5.5 |

[a]The ratio of radial amplitude to longitudinal amplitude.
[b]Power-related gain, in watts$^{-1}$ × 10$^3$.

TABLE 10

Summary of Remaining Data for the 20 kHz Horn of FIG. 17

| Combin. | Effic.[a] | Frequency (Hz) |
|---|---|---|
| 1 | 0.41 | 19,976 |
| 2 | 0.37 | 19,981 |
| 3 | 0.23 | 19,974 |

[1]Efficiency, in microns of radial amplitude per watt.

Figure 18:
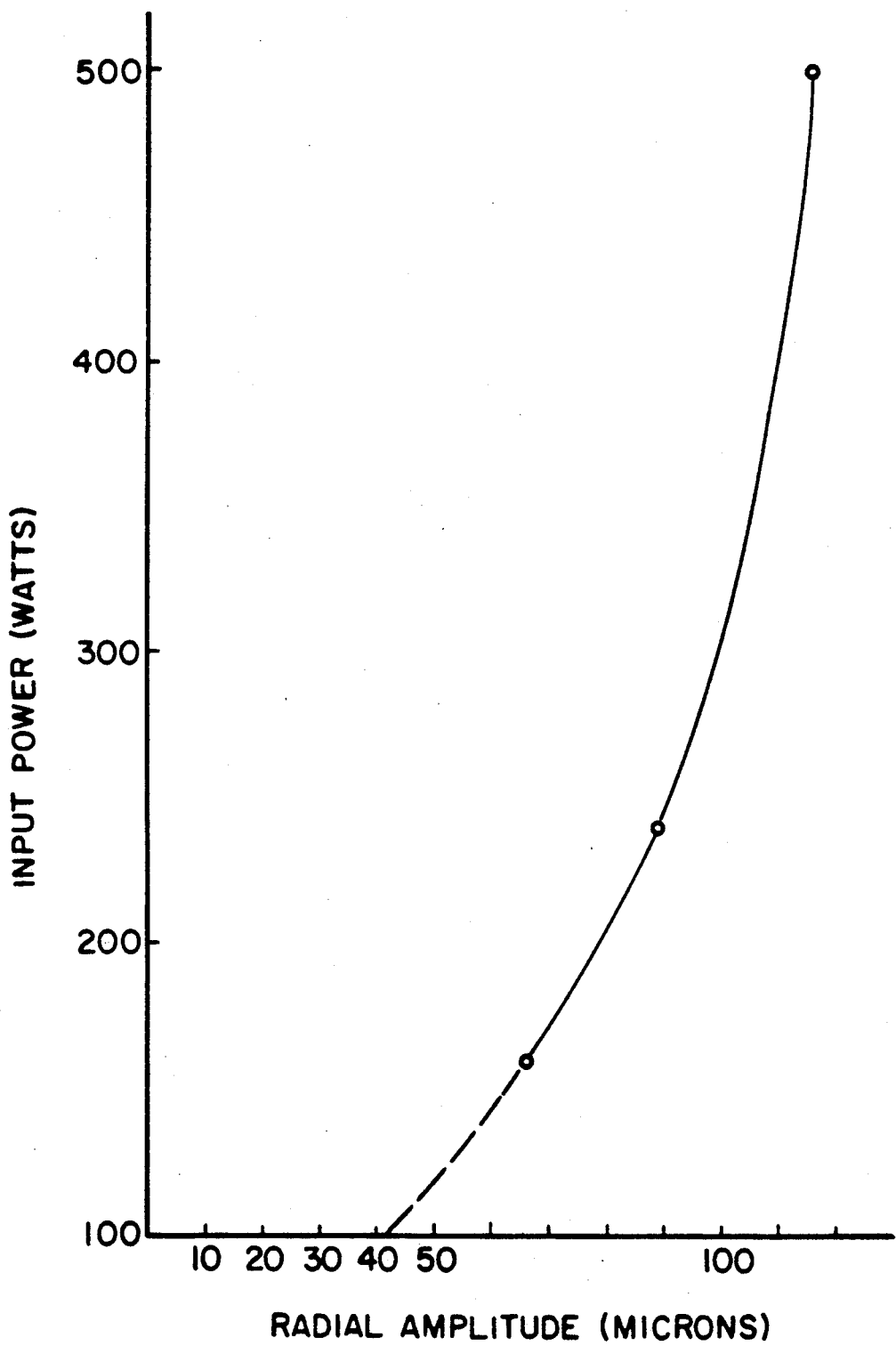
FIG. 18 is a plot of input power versus radial amplitude for three different booster combinations with a high efficiency ultrasonic rotary horn of the present invention, i.e., the horn represented by FIG. 17.

From Tables 9 and 10, it is evident that efficiency decreases with increasing input power. Stated differently, as input power increases, the incremental increases in amplitude become less. That is, there is not a linear relationship between input power and radial amplitude. This relationship is graphically demonstrated by plotting the input power and amplitude values from Table 9 as shown in FIG. 18. While the lowest booster gain combination used gave an input power of 160 watts, the plot can be extrapolated to lower power values as shown by the broken line portion of the curve. From the figure, it is seen that increases in amplitude per watt of input power are greatest at lower input power values. For example, a 100-watt increase in power at the lower end results in an amplitude increase of about 40 microns, whereas at the high end of the curve the same increase in power gives an increase in amplitude of only about 6 microns. Thus, the plot clearly demonstrates that the horn of the present invention achieves amplitude values of from about 40 to about 110 microns at an input power of no more than about 400 watts. As will be demonstrated later, the control horn is capable of achieving a similar range of radial amplitudes, but only by significantly increasing input power.

In order to conserve space, Table 9 is a condensation of the data which were actually obtained. Five measurements were taken for each booster combination, with the radial amplitude being measured at the center of the radial surface. In each case, the values shown in the table were obtained. The last measurement was conducted differently, however, in that five measurements across the face of the radial surface were taken. In each case, identical amplitude readings were obtained. Thus, the variance for each booster combination was zero percent. It will be remembered from Example 1 that the variance values for the control horn and the Mecasonic horn were 2.5 and 8.2, respectively.

Additional data were obtained for each booster combination by connecting a Branson Model J-4 Power Control (Branson Sonic Power Company, Danbury, Conn.) to Generator 605 (see FIG. 6). This permitted varying the input power as a percentage of the maximum, i.e., 100 percent. Amplitude measurements in the center of the radial surface again were taken while incrementally increasing the J-4 power setting. The results are summarized in Tables 11-13.

TABLE 11

Incremental Power Setting Results for the First Booster Combination of the Horn of the Present Invention

| J-4 Setting % Full Power | Power (watts) | Radial Amplitude (microns) | Effic.[a] |
|---|---|---|---|
| 20 | 35 | 29.2 | 0.83 |
| 25 | 45 | 31.8 | 0.71 |
| 30 | 55 | 35.6 | 0.65 |
| 35 | 60 | 38.1 | 0.64 |
| 40 | 70 | 40.6 | 0.58 |
| 45 | 80 | 43.2 | 0.54 |
| 50 | 90 | 45.7 | 0.51 |
| 55 | 100 | 48.3 | 0.48 |
| 60 | 110 | 50.8 | 0.46 |
| 65 | 120 | 52.1 | 0.43 |
| 70 | 125 | 54.6 | 0.44 |
| 75 | 135 | 55.9 | 0.41 |
| 80 | 145 | 58.4 | 0.40 |
| 85 | 150 | 59.7 | 0.40 |
| 90 | 160 | 62.2 | 0.39 |
| 95 | 165 | 63.5 | 0.38 |
| 100 | 175 | 66.0 | 0.38 |

[a]Efficiency, in microns of radial amplitude per watt.

TABLE 12

Incremental Power Setting Results for the Second Booster Combination of the Horn of the Present Invention

| J-4 Setting % Full Power | Power (watts) | Radial Amplitude (microns) | Effic.[a] |
|---|---|---|---|
| 20 | 55 | 40.6 | 0.74 |
| 25 | 70 | 45.7 | 0.65 |
| 30 | 85 | 50.8 | 0.60 |
| 35 | 100 | 53.3 | 0.53 |
| 40 | 110 | 55.9 | 0.51 |
| 45 | 125 | 61.0 | 0.49 |
| 50 | 140 | 63.5 | 0.45 |
| 55 | 155 | 67.3 | 0.43 |
| 60 | 170 | 68.6 | 0.40 |
| 65 | 185 | 72.4 | 0.39 |
| 70 | 200 | 76.2 | 0.38 |
| 75 | 210 | 77.5 | 0.37 |
| 80 | 225 | 81.3 | 0.36 |

TABLE 12-continued

Incremental Power Setting Results
for the Second Booster Combination
of the Horn of the Present Invention

| J-4 Setting % Full Power | Power (watts) | Radial Amplitude (microns) | Effic.[a] |
|---|---|---|---|
| 85 | 235 | 83.8 | 0.36 |
| 90 | 250 | 86.4 | 0.35 |
| 95 | 265 | 88.9 | 0.34 |
| 100 | 275 | 91.4 | 0.33 |

[a]Efficiency, in microns of radial amplitude per watt.

TABLE 13

Incremental Power Setting Results
for the Third Booster Combination
of the Horn of the Present Invention

| J-4 Setting % Full Power | Power (watts) | Radial Amplitude (microns) | Effic.[a] |
|---|---|---|---|
| 20 | 135 | 52.1 | 0.39 |
| 25 | 180 | 59.7 | 0.33 |
| 30 | 220 | 66.0 | 0.30 |
| 35 | 240 | 71.1 | 0.30 |
| 40 | 260 | 74.9 | 0.29 |
| 45 | 285 | 80.0 | 0.28 |
| 50 | 305 | 83.8 | 0.27 |
| 55 | 330 | 87.6 | 0.27 |
| 60 | 350 | 91.4 | 0.26 |
| 65 | 370 | 94.0 | 0.25 |
| 70 | 385 | 96.5 | 0.25 |
| 75 | 405 | 100.3 | 0.25 |
| 80 | 425 | 104.1 | 0.24 |
| 85 | 450 | 108.0 | 0.24 |
| 90 | 470 | 111.8 | 0.24 |
| 95 | 485 | 113.0 | 0.23 |
| 100 | 500 | 114.3 | 0.23 |

[a]Efficiency, in microns of radial amplitude per watt.

In order to simplify the comparison of the horn of the present invention with either the control horn or the Mecasonic horn, Table 6 from Example 1 is repeated below as Table 14 with the addition of a third column for the horn of the present invention.

TABLE 14

Summary of Average Values and Other Information
for the Control Horn, the Mecasonic Horn, and the
High Efficiency Horn of the Present Invention

| Item | Control Horn | Mecasonic Horn | H.E. Horn[a] |
|---|---|---|---|
| Input amplitude (microns) | 34.0 | 31.2 | 14.7[b] |
| Average radial amplitude (microns) | 40.4 | 38.4 | 38.1 |
| Average horn gain | 1.19 | 1.23 | 2.6 |
| Average power (watts) | 150 | 220 | 60 |
| Average PRG (watts$^{-1}$ × 10$^3$) | 7.9 | 5.6 | 43.3 |
| Radial surface width (mm) | 50.8 | 29.8 | 25.4 |
| Performance factor (microns watts$^{-1}$ mm) | 13.7 | 5.2 | 16.1 |

[a]The high efficiency horn of the present invention.
[b]Calculated by dividing the radial amplitude value at a power of 60 watts from Table 11 by the horn gain value from Table 9. The 60 watt amplitude value was selected so that all three horns have approximately equal amplitude values.

For comparison purposes, a horn identical with the control horn of Example 1, except that the horn had an integral elongated waveguide of standard design, was machined from a solid piece of titanium. The integral waveguide had a gain of 2.5:1. Variable power setting data were obtained for this horn and the three drive boosters as were employed with the horn of the present invention. The results are summarized in Tables 15-17.

TABLE 15

Incremental Power Setting Results
for the First Booster Combination
of a Control Horn Having an Integral Waveguide

| J-4 Setting % Full Power | Power (watts) | Radial Amplitude (microns) | Effic.[a] |
|---|---|---|---|
| 20 | 50 | 27.9 | 0.56 |
| 25 | 70 | 31.8 | 0.45 |
| 30 | 85 | 35.6 | 0.42 |
| 35 | 100 | 36.8 | 0.37 |
| 40 | 110 | 40.6 | 0.37 |
| 45 | 125 | 41.9 | 0.34 |
| 50 | 140 | 43.2 | 0.31 |
| 55 | 160 | 47.0 | 0.29 |
| 60 | 170 | 49.5 | 0.29 |
| 65 | 180 | 50.8 | 0.28 |
| 70 | 200 | 53.3 | 0.27 |
| 75 | 220 | 55.9 | 0.25 |
| 80 | 230 | 57.2 | 0.25 |
| 85 | 245 | 58.4 | 0.24 |
| 90 | 265 | 61.0 | 0.23 |
| 95 | 280 | 62.2 | 0.22 |
| 100 | 290 | 63.5 | 0.22 |

[a]Efficiency, in microns of radial amplitude per watt.

TABLE 16

Incremental Power Setting Results
for the Second Booster Combination
of a Control Horn Having and Integral Waveguide

| J-4 Setting % Full Power | Power (watts) | Radial Amplitude (microns) | Effic.[a] |
|---|---|---|---|
| 20 | 80 | 40.6 | 0.51 |
| 25 | 100 | 44.4 | 0.44 |
| 30 | 125 | 48.3 | 0.39 |
| 35 | 150 | 53.3 | 0.36 |
| 40 | 170 | 55.9 | 0.33 |
| 45 | 190 | 58.4 | 0.31 |
| 50 | 210 | 62.2 | 0.30 |
| 55 | 230 | 66.0 | 0.29 |
| 60 | 250 | 68.6 | 0.27 |
| 65 | 270 | 71.1 | 0.26 |
| 70 | 290 | 73.7 | 0.25 |
| 75 | 315 | 76.2 | 0.24 |
| 80 | 340 | 77.5 | 0.23 |
| 85 | 360 | 78.7 | 0.22 |
| 90 | 390 | 82.6 | 0.21 |
| 95 | 405 | 86.4 | 0.21 |
| 100 | 425 | 88.9 | 0.21 |

[a]Efficiency, in microns of radial amplitude per watt.

TABLE 17

Incremental Power Setting Results
for the Third Booster Combination
of a Control Horn Having an Integral Waveguide

| J-4 Setting % Full Power | Power (watts) | Radial Amplitude (microns) | Effic.[a] |
|---|---|---|---|
| 20 | 130 | 48.3 | 0.37 |
| 25 | 165 | 54.6 | 0.33 |
| 30 | 200 | 61.0 | 0.30 |
| 35 | 225 | 64.8 | 0.29 |
| 40 | 260 | 69.8 | 0.27 |
| 45 | 300 | 74.9 | 0.25 |
| 50 | 330 | 77.5 | 0.23 |
| 55 | 370 | 81.3 | 0.22 |
| 60 | 400 | 86.4 | 0.22 |
| 65 | 430 | 88.9 | 0.21 |
| 70 | 460 | 92.7 | 0.20 |
| 75 | 495 | 96.5 | 0.19 |
| 80 | 530 | 99.1 | 0.19 |
| 85 | 560 | 101.6 | 0.18 |
| 90 | 595 | 105.4 | 0.18 |
| 95 | 625 | 108.0 | 0.17 |
| 100 | 650 | 110.5 | 0.17 |

[a]Efficiency, in microns of radial amplitude per watt.

Figure 19:
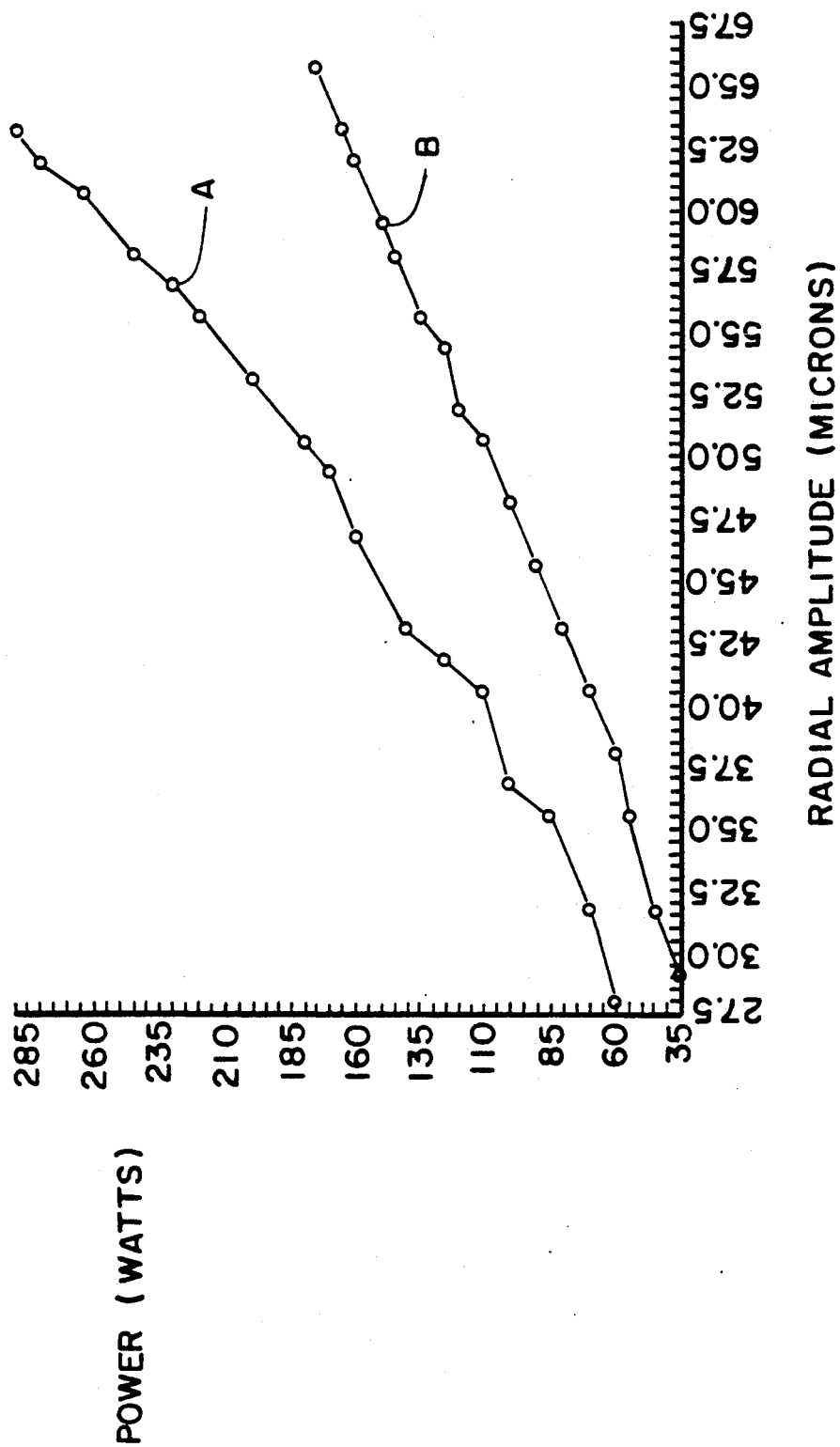
FIG. 19 consists of the plots of input power versus radial amplitude with a first booster combination for the horns represented by FIGS. 4 and 17.
Figure 20:
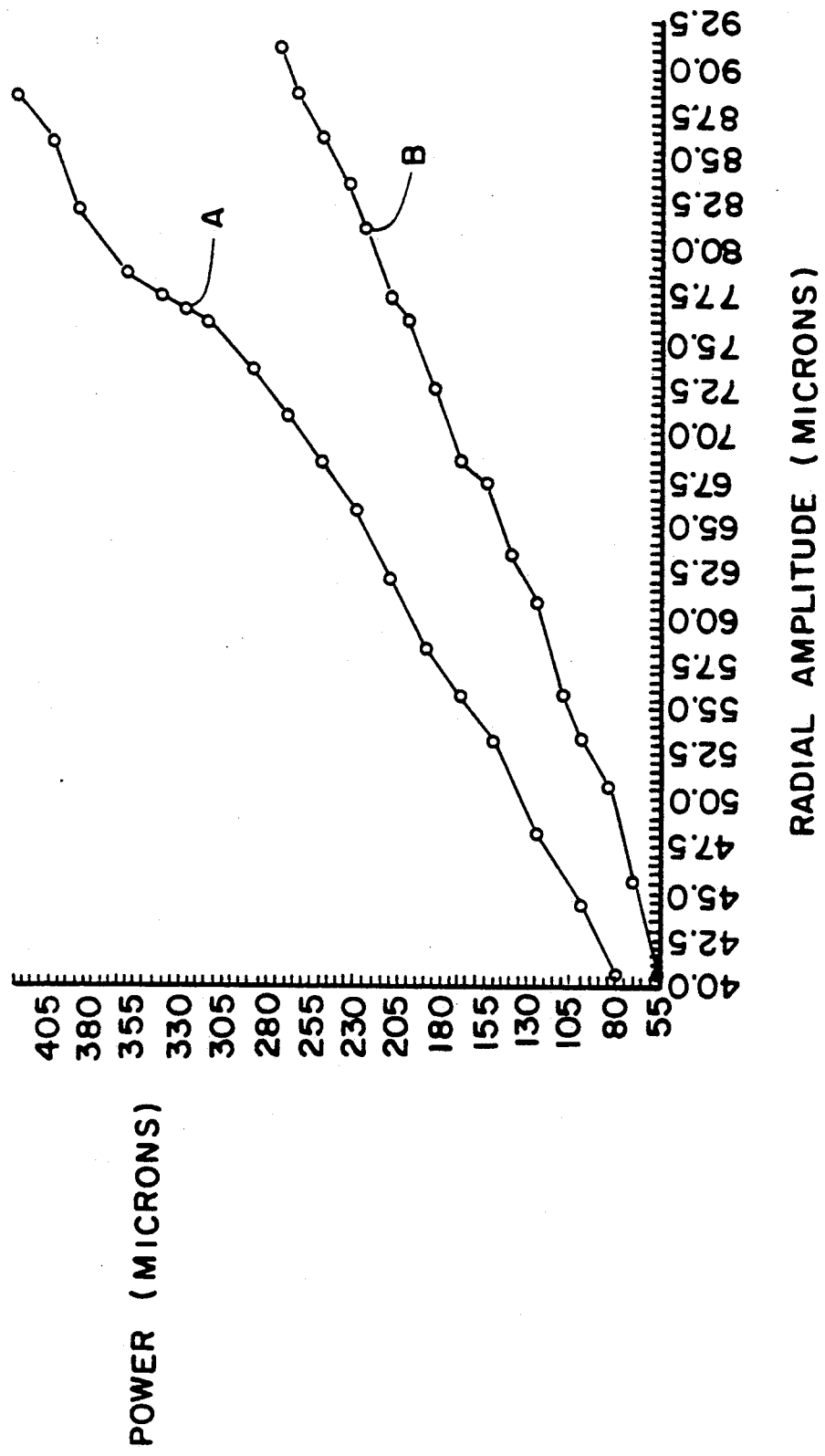
FIG. 20 consists of the plots of input power versus radial amplitude with a second booster combination for the horns represented by FIGS. 4 and 17.
Figure 21:
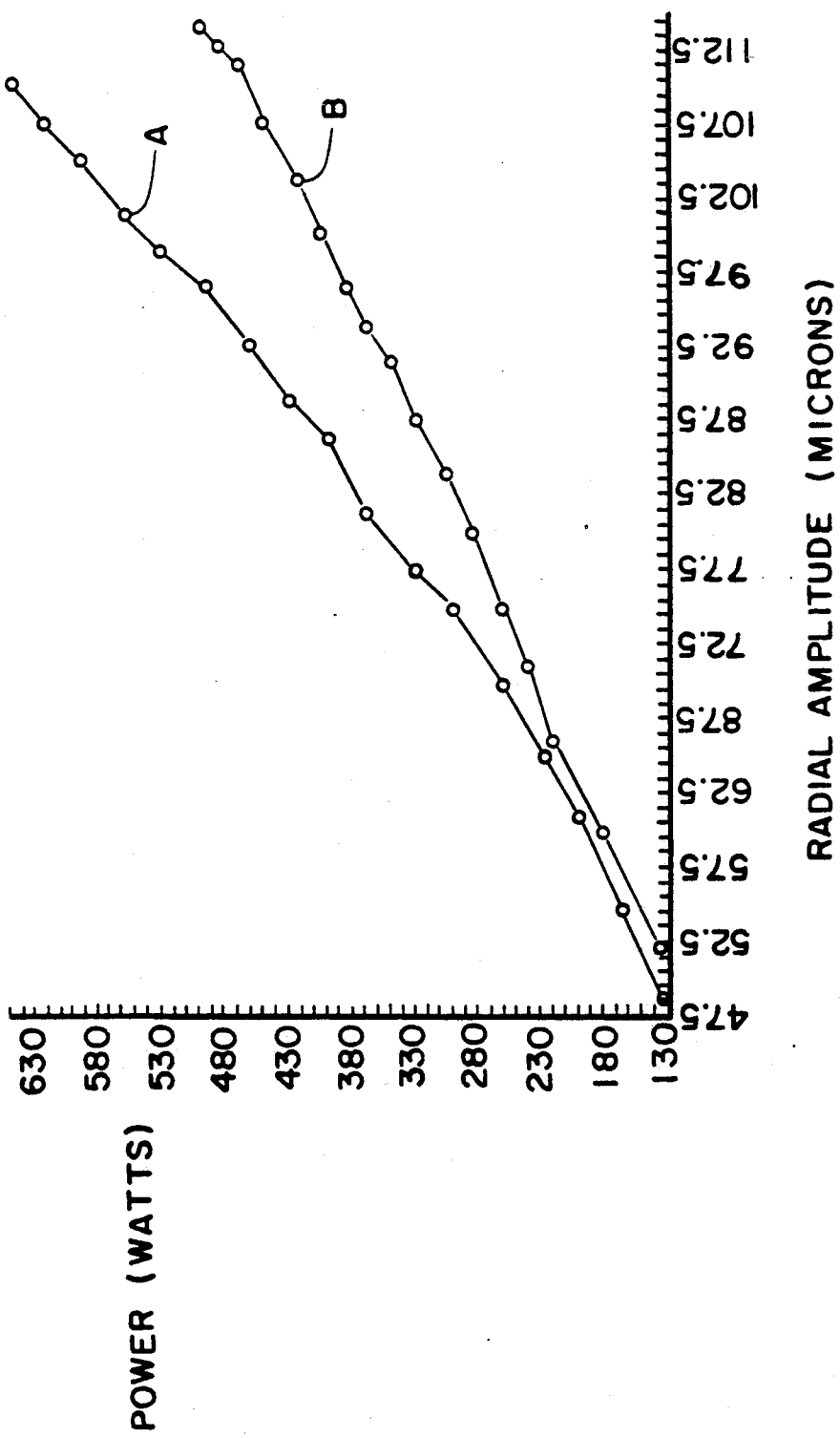
FIG. 21 consists of the plots of input power versus radial amplitude with a third booster combination for the horns represented by FIGS. 4 and 17.

While a comparison of the data in Tables 11-13, inclusive, with that of Tables 15-17, inclusive, demonstrates the improved efficiency of the horn of the present invention over that of the control horn, such improvement is graphically demonstrated by plotting the data of the tables as power in watts versus amplitude in microns. Such plots are shown in FIGS. 19-21. FIG. 19 consists of the plots of power versus amplitude from Tables 11 and 15 and, therefore, compares data obtained for each horn with a drive booster have a gain of 1. Similarly, FIG. 20 consists of the plots of power versus amplitude from Tables 12 and 16 and compares data obtained for each horn with a drive booster having a gain of 1.5. Finally, FIG. 21 consists of the plots of power versus amplitude from Tables 13 and 17 and compares data obtained for each horn with a drive booster having a gain of 2. In each of FIGS. 19-21, curve A represents the control horn and curve B represents the horn of the present invention. In each case, the improvement in the efficiency of the horn of the present invention is both readily apparent and significant. That is, the horn of the present invention achieves as high or higher radial amplitudes at significantly lower power requirements with each booster combination studied.

It perhaps should be noted that, because the horn of the present invention has a higher horn gain than the control horn, it was necessary to utilize an integral waveguide with the control horn which had a higher gain than that utilized with the horn of the present invention in order to have approximately equal amplitude ranges for both horns with each booster combination. In other words, the higher horn gain of the horn of the present invention compensated for the lower gain of the integral waveguide.

As the foregoing data clearly show, the horn of the present invention results in a significant improvement in efficiency as compared with the control horn of Example 1.

While the invention has been described in connection with specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

What is claimed is:

1. In an ultrasonic rotary horn intended to be excited at a frequency of from about 18 to about 60 kHz, which horn comprises a shaped, solid metal object having a radial surface terminated by a first end and a second end, and a rotational axis, in which each of said ends is defined by a surface and said object is radially symmetrical, the improvement which comprises:
   (A) the diameter of said horn is in the range of from about 4 cm to about 19 cm;
   (B) the width of said horn at said radial surface is from about 0.6 cm to about 13 cm;
   (C) the thickness of said horn at the rotational axis thereof is from about 0.6 cm to about 15 cm and is independent of the width of said horn at said radial surface;
   (D) the thickness of said horn at the rotational axis is greater than the width of said horn at said radial surface;
   (E) said horn has a mass in the range of from about 0.06 kg to about 30 kg;
   (F) said diameter, width, and thickness are selected for a desired frequency so that said horn, upon being excited by ultrasonic energy at such frequency which is input at the rotational axis at, and substantially perpendicular to, one or both of said ends, is adapted to resonate in a manner such that:
   (1) the first end is excited and moves substantially in phase with the movement of the source of excitation;
   (2) the second end, whether or not it is actively excited, moves substantially out of phase with the movement of the excited first end;
   (3) said radial surface also moves substantially out of phase with the movement of the excited first end; and
   (4) said horn exhibits a single nodal point at its geometric center;
   (G) said horn operates at an efficiency of greater than 0.2 microns per watt; and
   (H) said first end and said second end have a substantially convex configuration which comprises a central, circular, flat portion which is concentric with said rotational axis and a generally concave portion from said flat portion to said radial surface, in which:
   (1) the diameter of said flat portion is at least about 20 percent of the diameter of the horn;
   (2) said generally concave portion is a curved surface having radial symmetry and a curvilinear profile in cross-section through said rotational axis which lies in the triangular area defined by (i) a straight line leading from the outer boundary of said flat portion to the edge of said radial surface; (ii) a straight line which is parallel with the rotational axis and which begins at the outer boundary of said flat portion and extends toward the interior of said horn; and (iii) a straight line which is perpendicular to the rotational axis and which extends from the edge of said radial surface to said straight line parallel with the rotational axis.

2. The ultrasonic rotary horn of claim 1, in which said horn operates at an efficiency of greater than 0.3 microns per watt.

3. The ultrasonic rotary horn of claim 1, in which said horn achieves radial amplitudes of from about 40 to about 110 microns at an input power of no more than about 400 watts.

4. The ultrasonic rotary horn of claim 1, in which a stud protrudes from and is concentric with one of said ends and is an integral part of said horn.

5. The ultrasonic rotary horn of claim 4, in which said stud is threaded.

6. The ultrasonic rotary horn of claim 1, in which said radial surface has a linear profile.

7. The ultrasonic rotary horn of claim 1, in which said radial surface has a nonlinear profile.

8. In an apparatus for ultrasonically bonding two or more materials together, or otherwise ultrasonically processing a material, which apparatus comprises an ultrasonic rotary horn intended to be excited at a frequency of from about 18 to about 60 kHz, a vibrator means for providing a source of longitudinal mechanical vibration coupled to one or both ends of said horn, optionally through an elongated waveguide, support means for said ultrasonic rotary horn, drive means for rotating said ultrasonic rotary horn, and a rotatable anvil in close proximity to said ultrasonic rotary horn, the improvement which comprises employing as said ultrasonic rotary horn a shaped, solid metal object having a radial surface terminated by a first end and a second end, and a rotational axis, in which each of said ends is defined by a surface and said object is radially symmetrical, in which:

(A) the diameter of said horn is in the range of from about 4 cm to about 19 cm;

(B) the width of said horn at said radial surface is from about 0.6 cm to about 13 cm;

(C) the thickness of said horn at the rotational axis thereof is from about 0.6 cm to about 15 cm and is independent of the width of said horn at said radial surface;

(D) the thickness of said horn at the rotational axis is greater than the width of said horn at said radial surface;

(E) said horn has a mass in the range of from about 0.06 kg to about 30 kg;

(F) said diameter, width, and thickness are selected for a desired frequency so that said horn, upon being excited by ultrasonic energy at such frequency which is input at the rotational axis at, and substantially perpendicular to, one or both of said ends, is adapted to resonate in a manner such that:
  (1) the first end is excited and moves substantially in phase with the movement of the source of excitation;
  (2) the second end, whether or not it is actively excited, moves substantially out of phase with the movement of the excited first end;
  (3) said radial surface also moves substantially out of phase with the movement of the excited first end; and
  (4) said horn exhibits a single nodal point at its geometric center;

(G) said horn operates at an efficiency of greater than 0.2 microns per watt; and (H) said first end and said second end have a substantially convex configuration which comprises a central, circular, flat portion which is concentric with said rotational axis and a generally concave portion from said flat portion to said radial surface, in which:
  (1) the diameter of said flat portion is at least about 20 percent of the diameter of the horn;
  (2) said generally concave portion is a curved surface having radial symmetry and a curvilinear profile in cross-section through said rotational axis which lies in the triangular area defined by (i) a straight line leading from the outer boundary of said flat portion to the edge of said radial surface; (ii) a straight line which is parallel with the rotational axis and which begins at the outer boundary of said flat portion and extends inwardly toward the interior of said horn; and (iii) a straight line which is perpendicular to the rotational axis and which extends from the edge of said radial surface to said straight line parallel with the rotational axis.

9. The ultrasonic rotary horn of claim 8, in which said horn operates at an efficiency of greater than 0.3 microns per watt.

10. The ultrasonic rotary horn of claim 8, in which said horn achieves radial amplitudes of from about 40 to about 110 microns at an input power of no more than about 400 watts.

11. The ultrasonic rotary horn of claim 8, in which said radial surface has a linear profile.

12. The ultrasonic rotary horn of claim 8, in which said radial surface has a nonlinear profile.

* * * * *

UNITED STATES PATENT AND TRADEMARK OFFICE
CERTIFICATE OF CORRECTION

PATENT NO. : 5,110,403

DATED : May 5, 1992

INVENTOR(S) : Thomas D. Ehlert

It is certified that error appears in the above-identified patent and that said Letters Patent is hereby corrected as shown below:

Column 2, line 9, "1,092,053" should read --1,092,052--;

Column 5, line 16, "hereinafter)" should read --defined hereinafter)--;

Column 6, line 57, "work-contracting" should read --work-contacting--;

Column 14, line 25, "(omitted line in" should read --Table...44  8.89)--;

Column 25, line 7, "Figs 19-21. Fig 19" should read --Figs 15-17. Fig 19--

Signed and Sealed this

Thirtieth Day of November, 1993

Attest:

BRUCE LEHMAN

Attesting Officer

Commissioner of Patents and Trademarks